(12) United States Patent
Tseng et al.

(10) Patent No.: US 11,709,345 B2
(45) Date of Patent: Jul. 25, 2023

(54) OPTICAL LENS ASSEMBLY COMPRISING SEVEN LENSES OF -++--+- OR +++--+- REFRACTIVE POWERS, IMAGE CAPTURING UNIT AND ELECTRONIC DEVICE

(71) Applicant: LARGAN PRECISION CO., LTD., Taichung (TW)

(72) Inventors: Yu-Tai Tseng, Taichung (TW);
Chun-Che Hsueh, Taichung (TW);
Hung-Shuo Chen, Taichung (TW);
Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 145 days.

(21) Appl. No.: 17/403,618

(22) Filed: Aug. 16, 2021

(65) Prior Publication Data
US 2021/0373298 A1 Dec. 2, 2021

Related U.S. Application Data

(62) Division of application No. 16/525,524, filed on Jul. 29, 2019, now Pat. No. 11,125,978.

(30) Foreign Application Priority Data

Apr. 24, 2019 (TW) .................. 108114320

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 9,706,093 B2 | 7/2017 | Chen |
| 2017/0003482 A1 | 1/2017 | Chen |

(Continued)

FOREIGN PATENT DOCUMENTS

| CN | 108107551 A | 6/2018 |
| CN | 109116527 A | 1/2019 |

(Continued)

OTHER PUBLICATIONS

IN Office Action in Application No. 201934037576 dated Mar. 4, 2021.

(Continued)

*Primary Examiner* — Wen Huang
(74) *Attorney, Agent, or Firm* — Maschoff Brennan

(57) ABSTRACT

An optical lens assembly includes seven lens elements which are, in order from object side to image side: first lens element, second lens element, third lens element, fourth lens element, fifth lens element, sixth lens element and seventh lens element. The first lens element has object-side surface having at least one convex shape in off-axis region thereof. The second lens element with positive refractive power has object-side surface being convex in paraxial region thereof. The third lens element has image-side surface being convex in paraxial region thereof. The sixth lens element with positive refractive power has object-side surface being convex in paraxial region thereof. The seventh lens element has image-side surface being concave in paraxial region thereof, and the image-side surface of the seventh lens element has at least one convex critical point in off-axis region thereof. The optical lens assembly has a total of seven lens elements.

9 Claims, 19 Drawing Sheets

(56) References Cited

U.S. PATENT DOCUMENTS

2018/0188493 A1  7/2018 Huang
2022/0365316 A1* 11/2022 Jia ........................... G02B 9/64

FOREIGN PATENT DOCUMENTS

| CN | 109375351 | A  | 2/2019  |
|----|-----------|----|---------|
| CN | 208506350 | U  | 2/2019  |
| CN | 109752826 | A  | 5/2019  |
| CN | 110174743 | A  | 8/2019  |
| WO | 2020-191951 | A1 | 10/2020 |

OTHER PUBLICATIONS

Chinese Office Action dated Aug. 4, 2021 as received in application No. 201910371480.5.

* cited by examiner

OPTICAL LENS ASSEMBLY COMPRISING SEVEN LENSES OF -++--+- OR +++--+- REFRACTIVE POWERS, IMAGE CAPTURING UNIT AND ELECTRONIC DEVICE

RELATED APPLICATIONS

This application is a divisional patent application of U.S. patent application Ser. No. 16/525,524, filed on Jul. 29, 2019, which claims priority to Taiwan Application 108114320, filed on Apr. 24, 2019, which is incorporated by reference herein in its entirety.

BACKGROUND

Technical Field

The present disclosure relates to an optical lens assembly, an image capturing unit and an electronic device, more particularly to an optical lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element has an object-side surface having at least one convex shape in an off-axis region thereof. The second lens element with positive refractive power has an object-side surface being convex in a paraxial region thereof. The third lens element has an image-side surface being convex in a paraxial region thereof. The sixth lens element with positive refractive power has an object-side surface being convex in a paraxial region thereof. The seventh lens element has an image-side surface being concave in a paraxial region thereof, and the image-side surface of the seventh lens element has at least one convex critical point in an off-axis region thereof. The optical lens assembly has a total of seven lens elements.

When a focal length of the optical lens assembly is f, a curvature radius of the object-side surface of the first lens element is R1, a curvature radius of an image-side surface of the first lens element is R2, a curvature radius of the object-side surface of the sixth lens element is R11, and a curvature radius of an image-side surface of the sixth lens element is R12, the following conditions are satisfied:

$f/R2<0.60$;

$(R11+R12)/(R11-R12)<0.50$; and $f/R1<0.20$.

According to another aspect of the present disclosure, an optical lens assembly includes seven lens elements. The seven lens elements are, in order from an object side to an image side, a first lens element, a second lens element, a third lens element, a fourth lens element, a fifth lens element, a sixth lens element and a seventh lens element.

The second lens element with positive refractive power has an object-side surface being convex in a paraxial region thereof. The third lens element has an image-side surface being convex in a paraxial region thereof. The sixth lens element with positive refractive power has an object-side surface being convex in a paraxial region thereof. The seventh lens element has an image-side surface being concave in a paraxial region thereof, and the image-side surface of the seventh lens element has at least one convex critical point in an off-axis region thereof. The optical lens assembly has a total of seven lens elements.

When a focal length of the optical lens assembly is f, a focal length of the second lens element is f2, a focal length of the third lens element is f3, a curvature radius of an image-side surface of the first lens element is R2, a curvature radius of the object-side surface of the sixth lens element is R11, and a curvature radius of an image-side surface of the sixth lens element is R12, the following conditions are satisfied:

$f/R2<0.60$;

$(R11+R12)/(R11-R12)<0.50$; and $f2/f3<7.5$.

According to another aspect of the present disclosure, an image capturing unit includes one of the aforementioned optical lens assemblies and an image sensor, wherein the image sensor is disposed on an image surface of the optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
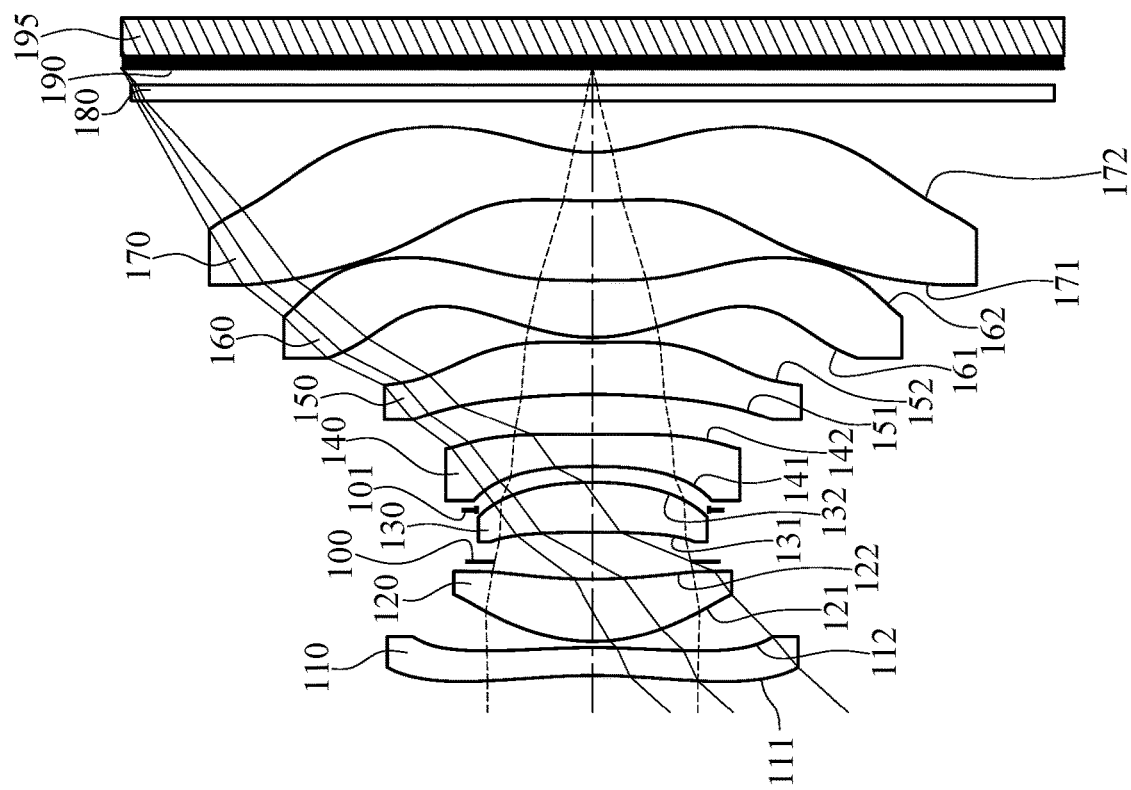
FIG. 1 is a schematic view of an image capturing unit according to the 1st embodiment of the present disclosure.

An optical lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element can have an object-side surface having at least one convex shape in an off-axis region thereof. Therefore, it is favorable for gathering peripheral light in the optical lens assembly so as to meet the requirement of a wide field of view. Moreover, the object-side surface of the first lens element can be concave in a paraxial region thereof. Therefore, it is favorable for enlarging the viewing angle of the optical lens assembly and thereby providing a wider field of view for the same. Moreover, the object-side surface of the first lens element can have at least one convex critical point in the off-axis region thereof. Therefore, it is favorable for correcting off-axis aberrations. The first lens element can have an image-side surface being convex in a paraxial region thereof, and the image-side surface of the first lens element can have at least one concave critical point in an off-axis region thereof. Therefore, it is favorable for controlling the shape change from the center to the periphery of the first lens element so as to utilize space properly for the first lens element, thereby reducing the total track length of the optical lens assembly. Please refer to FIG. 19, which shows a schematic view of a convex critical point C of the object-side surface 111 of the first lens element 110 and a concave critical point C of the image-side surface 112 of the first lens element 110 according to the 1st embodiment of the present disclosure.

The second lens element has positive refractive power and has an object-side surface being convex in a paraxial region thereof. Therefore, it is favorable for balancing the positive refractive power distribution of the optical lens assembly so as to reduce aberrations caused by any single lens element thereof.

The third lens element has an image-side surface being convex in a paraxial region thereof. Therefore, it is favorable for adjusting the travelling direction of light so as to obtain a short total track length of the optical lens assembly.

The fourth lens element can have negative refractive power. Therefore, it is favorable for correcting aberrations caused by the miniaturization of the optical lens assembly. Moreover, the fourth lens element can have an image-side surface being concave in a paraxial region thereof. Therefore, it is favorable for reducing the back focal length of the optical lens assembly.

The fifth lens element can have negative refractive power. Therefore, it is favorable for correcting aberrations when in combination with the sixth lens element. The fifth lens element can have an image-side surface being concave in a paraxial region thereof, and the image-side surface of the fifth lens element can have at least one convex critical point in an off-axis region thereof. Therefore, it is favorable for adjusting the shape of the fifth lens element so as to correct distortion and off-axis aberrations.

The sixth lens element has positive refractive power, and the sixth lens element has an object-side surface being convex in a paraxial region thereof. Therefore, it is favorable for improving the light converging capability of the optical lens assembly.

Figure 19:
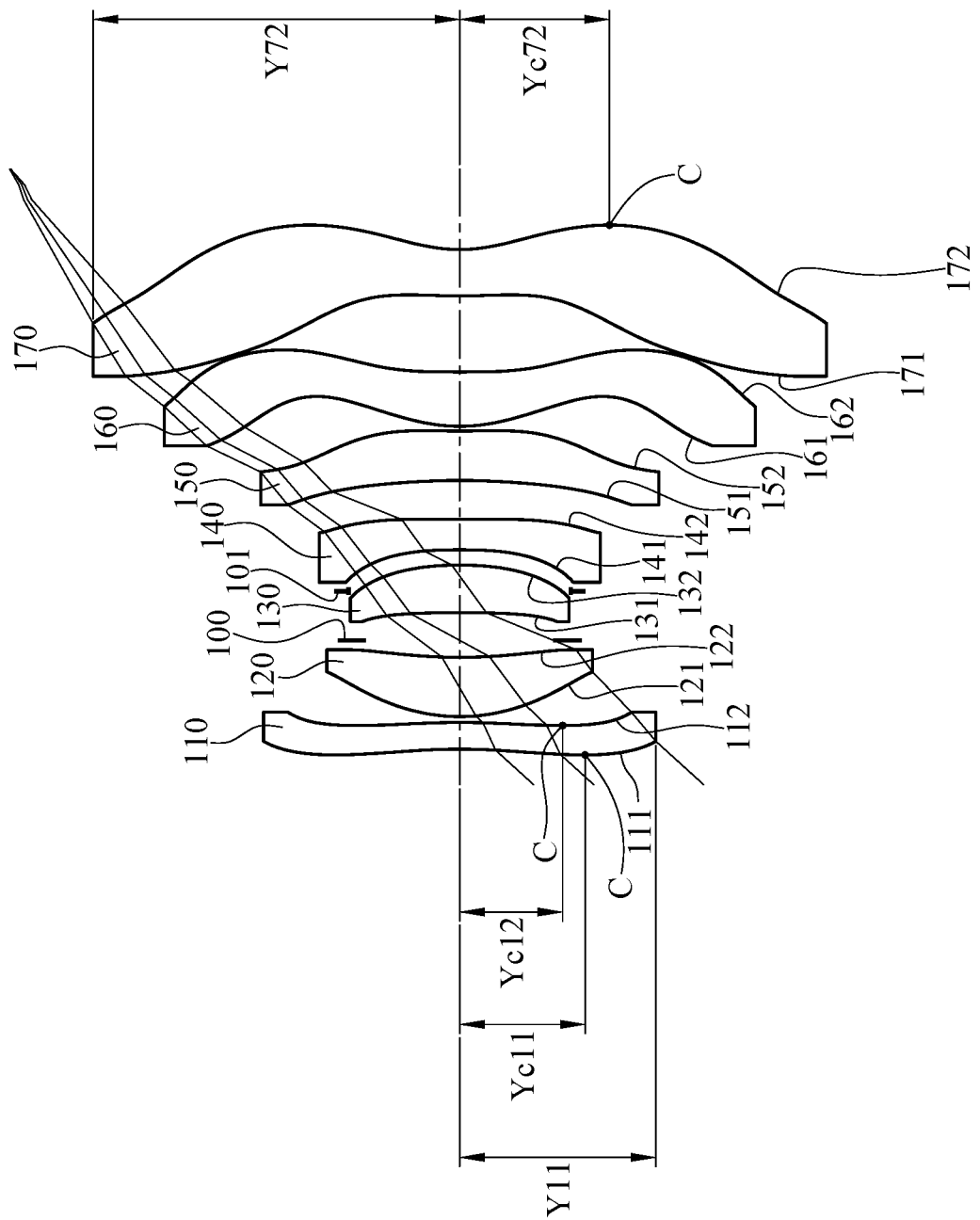
FIG. 19 shows a schematic view of Y11, Y72, Yc11, Yc12, Yc72 and critical points of the first lens element and the seventh lens element according to the 1st embodiment of the present disclosure.

The seventh lens element has an image-side surface being concave in a paraxial region thereof, and the image-side surface of the seventh lens element has at least one convex critical point in an off-axis region thereof. Therefore, it is favorable for controlling the central and peripheral light paths accordingly so as to obtain a proper back focal length of the optical lens assembly. Please refer to FIG. 19, which shows a schematic view of a convex critical point C of the image-side surface 172 of the seventh lens element 170 according to the 1st embodiment of the present disclosure. The critical points on the object-side surface of the first lens element, the image-side surface of the first lens element and the image-side surface of the seventh lens element in FIG. 19 are only exemplary. The other lens surfaces of the seven lens elements may also have one or more critical points.

When a focal length of the optical lens assembly is f, and a curvature radius of the image-side surface of the first lens element is R2, the following condition is satisfied: f/R2<0.60. Therefore, it is favorable for mitigating the shape change from the center to the periphery of the first lens element so as to further utilize space properly for the first lens element featuring weaker refractive power, thereby reducing the total track length of the optical lens assembly.

When a curvature radius of the object-side surface of the sixth lens element is R11, and a curvature radius of an image-side surface of the sixth lens element is R12, the following condition is satisfied: (R11+R12)/(R11−R12)<0.50. Therefore, it is favorable for the sixth lens element to have a thinner center thickness so as to reduce the total track length of the optical lens assembly, thereby meeting the requirement of compactness. Moreover, the following condition can also be satisfied: −3.0<(R11+R12)/(R11−R12)<0. Moreover, the following condition can also be satisfied: −2.0<(R11+R12)/(R11−R12)<−0.50.

When the focal length of the optical lens assembly is f, and a curvature radius of the object-side surface of the first lens element is R1, the following condition can be satisfied:

f/R1<0.20. Therefore, it is favorable for retrieving peripheral light in the optical lens assembly so as to provide a wide field of view.

When a focal length of the second lens element is f2, and a focal length of the third lens element is f3, the following condition can be satisfied: f2/f3<9.0. Therefore, it is favorable for preventing an excessively large change of the refractive power between the second and third lens elements to improve light convergence. Moreover, the following condition can also be satisfied: f2/f3<7.5. Moreover, the following condition can also be satisfied: f2/f3<5.0. Moreover, the following condition can also be satisfied: f2/f3<2.0.

When the focal length of the optical lens assembly is f, the curvature radius of the object-side surface of the first lens element is R1, and the curvature radius of the image-side surface of the first lens element is R2, the following condition can be satisfied: (f/R1)+(f/R2)<−0.80. Therefore, it is favorable for the first lens element to properly utilize space while providing a wide field of view.

When an axial distance between the object-side surface of the first lens element and an image surface is TL, a maximum image height of the optical lens assembly (half of a diagonal length of an effective photosensitive area of an image sensor) is ImgH, and a maximum field of view of the optical lens assembly is FOV, the following condition can be satisfied: 0.80<(TL/ImgH)+cot(FOV)<1.25. Therefore, it is favorable for obtaining a balance between a wide field of view and a short total track length.

When a maximum effective radius of the object-side surface of the first lens element is Y11, and a maximum effective radius of the image-side surface of the seventh lens element is Y72, the following condition can be satisfied: Y11/Y72<1.0. Therefore, it is favorable for reducing the size of the aperture diameter on the object side of the optical lens assembly so as to miniaturize the optical lens assembly, thereby improving space utilization. Moreover, the following condition can also be satisfied: Y11/Y72<0.50. Moreover, the following condition can also be satisfied: Y11/Y72<0.40. Please refer to FIG. 19, which shows a schematic view of Y11 and Y72 according to the 1st embodiment of the present disclosure.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a refractive index of the i-th lens element is Ni, at least one lens element of the optical lens assembly can satisfy the following condition: 8.0<Vi/Ni<11.8, wherein i=1, 2, 3, 4, 5, 6 or 7. Therefore, it is favorable for correcting chromatic aberration so as to improve image quality.

When the focal length of the optical lens assembly is f, and a curvature radius of an object-side surface of the seventh lens element is R13, the following condition can be satisfied: f/R13<1.50. Therefore, it is favorable for featuring a larger effective radius with a sufficient thickness of the seventh lens element so as to increase the manufacturing feasibility of the lens element.

When the maximum effective radius of the image-side surface of the seventh lens element is Y72, and an axial distance between the image-side surface of the seventh lens element and the image surface is BL, the following condition can be satisfied: 2.50<Y72/BL. Therefore, it is favorable for obtaining a balance between a wide field of view and a short total track length. Moreover, the following condition can also be satisfied: 3.75<Y72/BL<10.0.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and an axial distance between the sixth lens element and the seventh lens element is T67, the following conditions can be satisfied: 1.0<T67/T12; 1.0<T67/T23; 1.0<T67/T34; 1.0<T67/T45; and 1.0<T67/T56. Therefore, the arrangement of the sixth and seventh lens elements is favorable for correcting aberrations, thereby improving the image quality of the optical lens assembly with a wide view angle configuration.

When a vertical distance between the critical point on the object-side surface of the first lens element and an optical axis is Yc11, and the focal length of the optical lens assembly is f, the following condition can be satisfied: 0.20<Yc11/f<0.60. Therefore, it is favorable for gathering peripheral light in the optical lens assembly so as to provide a wide field of view. Please refer to FIG. 19, which shows a schematic view of Yc11 according to the 1st embodiment of the present disclosure.

When a vertical distance between the critical point on the image-side surface of the seventh lens element and the optical axis is Yc72, and the focal length of the optical lens assembly is f, the following condition can be satisfied: 0.20<Yc72/f<0.60. Therefore, it is favorable for correcting field curvature and reducing the total track length so as to achieve compactness and flatten the Petzval surface of the optical lens assembly. Please refer to FIG. 19, which shows a schematic view of Yc72 according to the 1st embodiment of the present disclosure.

When the focal length of the optical lens assembly is f, and a curvature radius of the image-side surface of the fourth lens element is R8, the following condition can be satisfied: −0.50<f/R8. Therefore, it is favorable for reducing the back focal length so as to obtain miniaturization of the optical lens assembly.

When the vertical distance between the critical point on the object-side surface of the first lens element and the optical axis is Yc11, and the vertical distance between the critical point on the image-side surface of the seventh lens element and the optical axis is Yc72, the following condition can be satisfied: 0.6<Yc11/Yc72<2.0. Therefore, it is favorable for correcting off-axis aberrations and effectively reducing the total track length of the optical lens assembly so as to meet the requirements of compactness and a wide field of view. Moreover, the following condition can also be satisfied: 0.7<Yc11/Yc72<1.5.

When a vertical distance between the critical point on the image-side surface of the first lens element and the optical axis is Yc12, and the focal length of the optical lens assembly is f, the following condition can be satisfied: 0.10<Yc12/f<0.50. Therefore, it is favorable for controlling the shape change from the center to the periphery of the first lens element so as to further utilize space properly for the first lens element featuring weaker refractive power, thereby reducing the total track length of the optical lens assembly. Please refer to FIG. 19, which shows a schematic view of Yc12 according to the 1st embodiment of the present disclosure.

According to the present disclosure, the aforementioned features and conditions can be utilized in numerous combinations so as to achieve corresponding effects.

According to the present disclosure, the lens elements of the optical lens assembly can be made of either glass or plastic material. When the lens elements are made of glass material, the refractive power distribution of the optical lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the optical lens assembly, based on the corresponding image sensor, can be flat or curved, especially a curved surface being concave facing towards the object side of the optical lens assembly.

According to the present disclosure, an image correction unit, such as a field flattener, can be optionally disposed between the lens element closest to the image side of the optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical lens assembly and thereby provides a wider field of view for the same.

According to the present disclosure, the optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
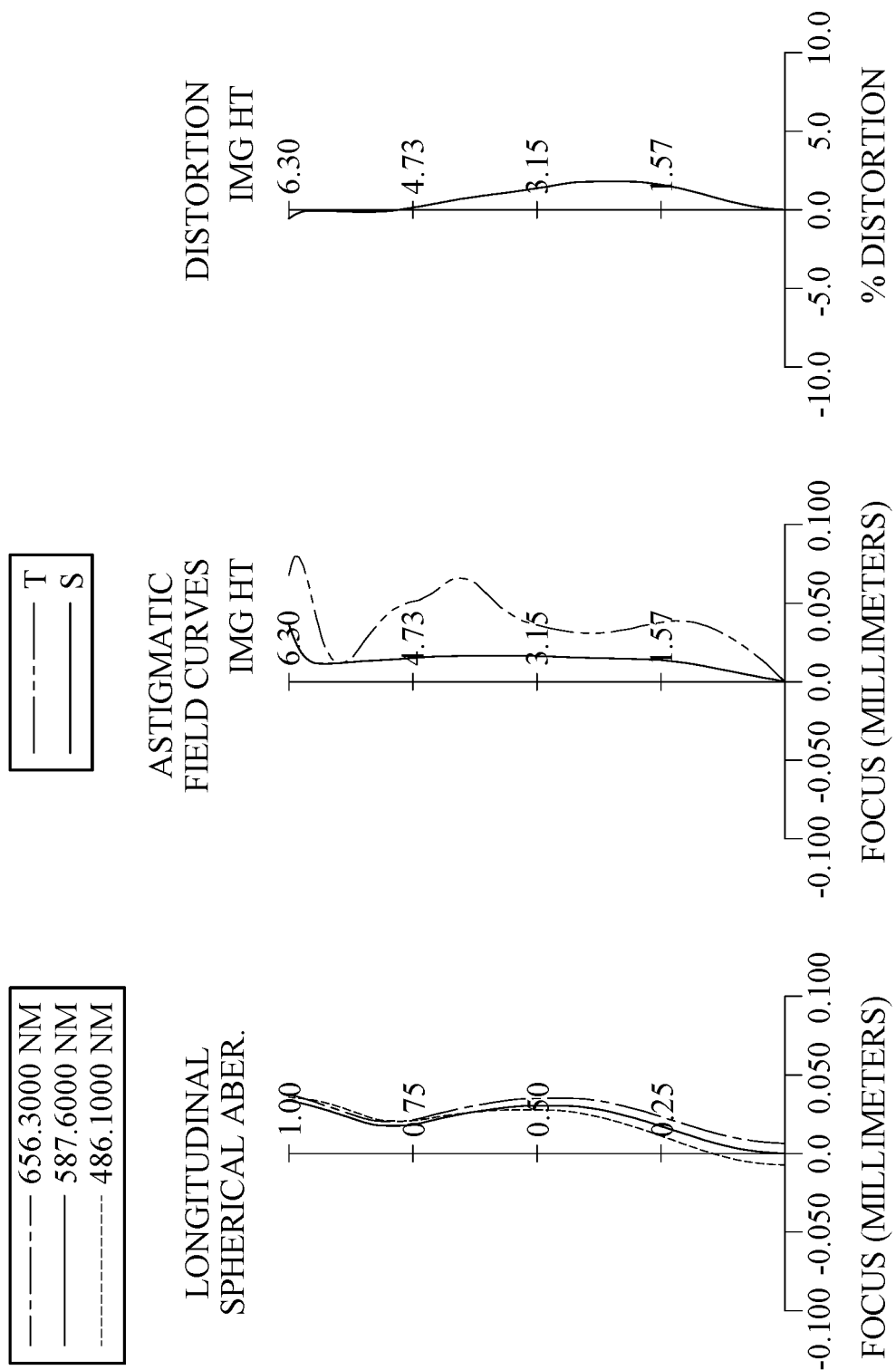
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical lens assembly (its reference numeral is omitted) of the present disclosure and an image sensor 195. The optical lens assembly includes, in order from an object side to an image side, a first lens element 110, a second lens element 120, an aperture stop 100, a third lens element 130, a stop 101, a fourth lens element 140, a fifth lens element 150, a sixth lens element 160, a seventh lens element 170, an IR-cut filter 180 and an image surface 190. The optical lens assembly includes seven lens elements (110, 120, 130, 140, 150, 160 and 170) with no additional lens element disposed between each of the adjacent seven lens elements.

The first lens element 110 with negative refractive power has an object-side surface 111 being concave in a paraxial region thereof and an image-side surface 112 being convex in a paraxial region thereof. The first lens element 110 is made of plastic material and has the object-side surface 111 and the image-side surface 112 being both aspheric. The object-side surface 111 of the first lens element 110 has at least one convex critical point in an off-axis region thereof. The image-side surface 112 of the first lens element 110 has at least one concave critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex critical point in an off-axis region thereof.

The IR-cut filter 180 is made of glass material and located between the seventh lens element 170 and the image surface 190, and will not affect the focal length of the optical lens assembly. The image sensor 195 is disposed on or near the image surface 190 of the optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical lens assembly of the image capturing unit according to the 1st embodiment, when a focal length of the optical lens assembly is f, an f-number of the optical lens assembly is Fno, and half of a maximum field of view of the optical lens assembly is HFOV, these parameters have the following values: f=5.73 millimeters (mm), Fno=2.03, HFOV=47.8 degrees (deg.).

When an Abbe number of the first lens element 110 is V1, and a refractive index of the first lens element 110 is N1, the following condition is satisfied: V1/N1=11.72.

When an Abbe number of the second lens element 120 is V2, and a refractive index of the second lens element 120 is N2, the following condition is satisfied: V2/N2=36.20.

When an Abbe number of the third lens element 130 is V3, and a refractive index of the third lens element 130 is N3, the following condition is satisfied: V3/N3=36.20.

When an Abbe number of the fourth lens element 140 is V4, and a refractive index of the fourth lens element 140 is N4, the following condition is satisfied: V4/N4=13.52.

When an Abbe number of the fifth lens element 150 is V5, and a refractive index of the fifth lens element 150 is N5, the following condition is satisfied: V5/N5=27.23.

When an Abbe number of the sixth lens element 160 is V6, and a refractive index of the sixth lens element 160 is N6, the following condition is satisfied: V6/N6=36.20.

When an Abbe number of the seventh lens element 170 is V7, and a refractive index of the seventh lens element 170 is N7, the following condition is satisfied: V7/N7=36.18.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=−1.05.

When the focal length of the optical lens assembly is f, and a curvature radius of the object-side surface 111 of the first lens element 110 is R1, the following condition is satisfied: f/R1=−0.73.

When the focal length of the optical lens assembly is f, and a curvature radius of the image-side surface 112 of the first lens element 110 is R2, the following condition is satisfied: f/R2=−0.53.

When the focal length of the optical lens assembly is f, the curvature radius of the object-side surface 111 of the first lens element 110 is R1, and the curvature radius of the image-side surface 112 of the first lens element 110 is R2, the following condition is satisfied: (f/R1)+(f/R2)=−1.26.

When the focal length of the optical lens assembly is f, and a curvature radius of the image-side surface 142 of the fourth lens element 140 is R8, the following condition is satisfied: f/R8=0.06.

When the focal length of the optical lens assembly is f, and a curvature radius of the object-side surface 171 of the seventh lens element 170 is R13, the following condition is satisfied: f/R13=0.63.

When a focal length of the second lens element 120 is f2, and a focal length of the third lens element 130 is f3, the following condition is satisfied: f2/f3=0.66.

When an axial distance between the first lens element 110 and the second lens element 120 is T12, and an axial distance between the sixth lens element 160 and the seventh lens element 170 is T67, the following condition is satisfied: T67/T12=13.04. In this embodiment, an axial distance between two adjacent lens elements is an air gap in a paraxial region between the two adjacent lens elements.

When an axial distance between the second lens element 120 and the third lens element 130 is T23, and the axial distance between the sixth lens element 160 and the seventh lens element 170 is T67, the following condition is satisfied: T67/T23=1.28.

When an axial distance between the third lens element 130 and the fourth lens element 140 is T34, and the axial distance between the sixth lens element 160 and the seventh lens element 170 is T67, the following condition is satisfied: T67/T34=1.70.

When an axial distance between the fourth lens element 140 and the fifth lens element 150 is T45, and the axial distance between the sixth lens element 160 and the seventh lens element 170 is T67, the following condition is satisfied: T67/T45=1.60.

When an axial distance between the fifth lens element 150 and the sixth lens element 160 is T56, and the axial distance between the sixth lens element 160 and the seventh lens element 170 is T67, the following condition is satisfied: T67/T56=4.97.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.53.

When a vertical distance between the critical point on the object-side surface 111 of the first lens element 110 and the optical axis is Yc11, and the focal length of the optical lens assembly is f, the following condition is satisfied: Yc11/f=0.30.

When a vertical distance between the critical point on the image-side surface 112 of the first lens element 110 and the optical axis is Yc12, and the focal length of the optical lens assembly is f, the following condition is satisfied: Yc12/f=0.25.

When a vertical distance between the critical point on the image-side surface 172 of the seventh lens element 170 and the optical axis is Yc72, and the focal length of the optical lens assembly is f, the following condition is satisfied: Yc72/f=0.37.

When the vertical distance between the critical point on the object-side surface 111 of the first lens element 110 and the optical axis is Yc11, and the vertical distance between the critical point on the image-side surface 172 of the seventh lens element 170 and the optical axis is Yc72, the following condition is satisfied: Yc11/Yc72=0.83.

When the maximum effective radius of the image-side surface 172 of the seventh lens element 170 is Y72, and an axial distance between the image-side surface 172 of the seventh lens element 170 and the image surface 190 is BL, the following condition is satisfied: Y72/BL=4.54.

When an axial distance between the object-side surface 111 of the first lens element 110 and the image surface 190 is TL, a maximum image height of the optical lens assembly is ImgH, and the maximum field of view of the optical lens assembly is FOV, the following condition is satisfied: TL/ImgH+cot(FOV)=1.20.

The detailed optical data of the 1st embodiment are shown in Table 1 and the aspheric surface data are shown in Table 2 below.

TABLE 1

1st Embodiment
f = 5.73 mm, Fno = 2.03, HFOV = 47.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.885 | (ASP) | 0.375 | Plastic | 1.667 | 19.5 | −46.29 |
| 2 | | −10.789 | (ASP) | 0.082 | | | | |
| 3 | Lens 2 | 2.566 | (ASP) | 0.833 | Plastic | 1.544 | 55.9 | 6.91 |
| 4 | | 7.149 | (ASP) | 0.238 | | | | |
| 5 | Ape. Stop | Plano | | 0.391 | | | | |
| 6 | Lens 3 | −20.973 | (ASP) | 0.668 | Plastic | 1.544 | 55.9 | 10.47 |
| 7 | | −4.528 | (ASP) | −0.368 | | | | |
| 8 | Stop | Plano | | 0.583 | | | | |
| 9 | Lens 4 | −7.988 | (ASP) | 0.430 | Plastic | 1.635 | 22.1 | −11.64 |
| 10 | | 100.000 | (ASP) | 0.545 | | | | |
| 11 | Lens 5 | −8.377 | (ASP) | 0.693 | Plastic | 1.562 | 42.5 | −8.60 |
| 12 | | 11.742 | (ASP) | 0.066 | | | | |
| 13 | Lens 6 | 2.246 | (ASP) | 0.765 | Plastic | 1.544 | 55.9 | 4.21 |
| 14 | | 97.348 | (ASP) | 1.069 | | | | |
| 15 | Lens 7 | 9.130 | (ASP) | 0.650 | Plastic | 1.544 | 55.9 | −5.27 |
| 16 | | 2.128 | (ASP) | 0.700 | | | | |
| 17 | IR-cut Filter | Plano | | 0.210 | Glass | 1.517 | 64.2 | — |
| 18 | | Plano | | 0.223 | | | | |
| 19 | Image | Plano | | 0.000 | | | | |

Note: Reference wavelength is 587.6 nm (d-line).
An effective radius of the stop 101 (Surface 8) is 1.560 mm.
An effective radius of the object-side surface 151 (Surface 11) is 2.415 mm.

TABLE 2

Aspheric Coefficients

| Surface # | 1 | 2 | 3 | 4 | 6 |
|---|---|---|---|---|---|
| k = | −5.6241E+01 | −4.2666E+01 | −1.0123E+00 | 1.3909E+00 | 0.0000E+00 |
| A4 = | 5.3384E−03 | 1.0988E−02 | −1.8135E−03 | −7.8413E−03 | −1.6191E−02 |

TABLE 2-continued

| Aspheric Coefficients | | | | | |
|---|---|---|---|---|---|
| A6 = | 2.5876E−04 | −1.3572E−03 | 2.8525E−03 | 4.8382E−04 | 3.2112E−03 |
| A8 = | −1.2701E−04 | 2.8772E−04 | −9.6717E−04 | −1.4385E−03 | −1.2045E−02 |
| A10 = | 2.1198E−05 | −4.2239E−05 | −5.3592E−06 | 2.5609E−04 | 1.0700E−02 |
| A12 = | −8.7982E−07 | 4.8482E−06 | — | — | −4.8068E−03 |
| A14 = | — | — | — | — | 7.7109E−04 |

| Surface # | 7 | 9 | 10 | 11 | 12 |
|---|---|---|---|---|---|
| k = | 3.3599E−01 | 0.0000E+00 | 0.0000E+00 | −4.6333E+00 | 0.0000E+00 |
| A4 = | −2.9921E−02 | −5.0413E−02 | −1.5736E−02 | 1.8520E−02 | −9.3713E−02 |
| A6 = | 1.6883E−04 | 8.5223E−03 | −8.6706E−03 | −8.6238E−03 | 3.9478E−02 |
| A8 = | 1.8052E−03 | −1.0226E−02 | 8.4859E−03 | −3.8044E−05 | −1.4326E−02 |
| A10 = | −9.7244E−04 | 1.4048E−02 | −3.3492E−03 | 1.0388E−03 | 3.6068E−03 |
| A12 = | −7.9232E−05 | −9.1449E−03 | 6.4114E−04 | −3.2372E−04 | −5.4730E−04 |
| A14 = | — | 2.6304E−03 | −6.2299E−05 | 4.1246E−05 | 4.8811E−05 |
| A16 = | — | −2.9333E−04 | 3.6757E−06 | −2.0843E−06 | −2.4317E−06 |
| A18 = | — | — | — | 2.0525E−08 | 5.4083E−08 |

| Surface # | 13 | 14 | 15 | 16 |
|---|---|---|---|---|
| k = | −6.3510E+00 | −8.5060E+01 | 1.9375E−01 | −9.7618E−01 |
| A4 = | −1.7797E−03 | 6.7055E−02 | −5.6031E−02 | −7.0647E−02 |
| A6 = | 4.9250E−03 | −2.5281E−02 | 4.0037E−03 | 1.4173E−02 |
| A8 = | −4.6552E−03 | 4.8406E−03 | 1.0630E−03 | −2.1965E−03 |
| A10 = | 1.4141E−03 | −5.9437E−04 | −2.4571E−04 | 2.3673E−04 |
| A12 = | −2.4096E−04 | 4.8958E−05 | 2.3126E−05 | −1.7047E−05 |
| A14 = | 2.5142E−05 | −2.6658E−06 | −1.2064E−06 | 7.9290E−07 |
| A16 = | −1.5727E−06 | 8.9687E−08 | 3.6303E−08 | −2.2652E−08 |
| A18 = | 5.3817E−08 | −1.6198E−09 | −5.8956E−10 | 3.5946E−10 |
| A20 = | −7.7268E−10 | 1.1155E−11 | 3.9947E−12 | −2.4184E−12 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
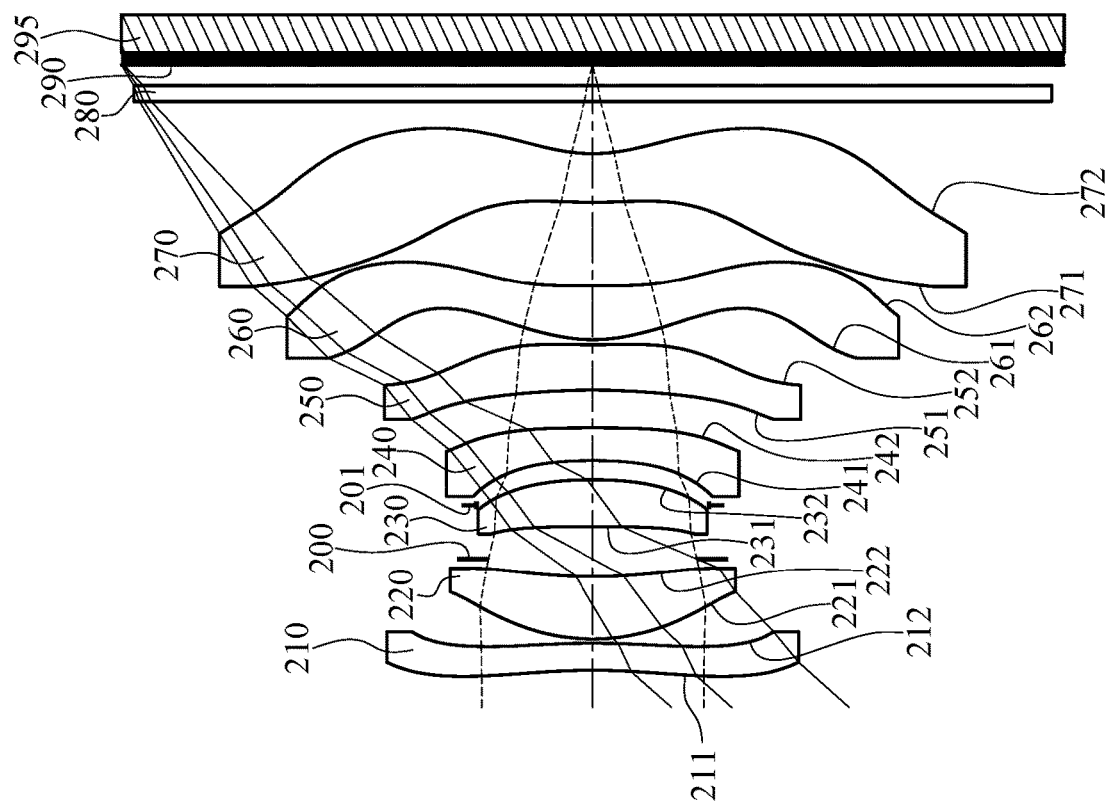
FIG. 3 is a schematic view of an image capturing unit according to the 2nd embodiment of the present disclosure.
Figure 4:
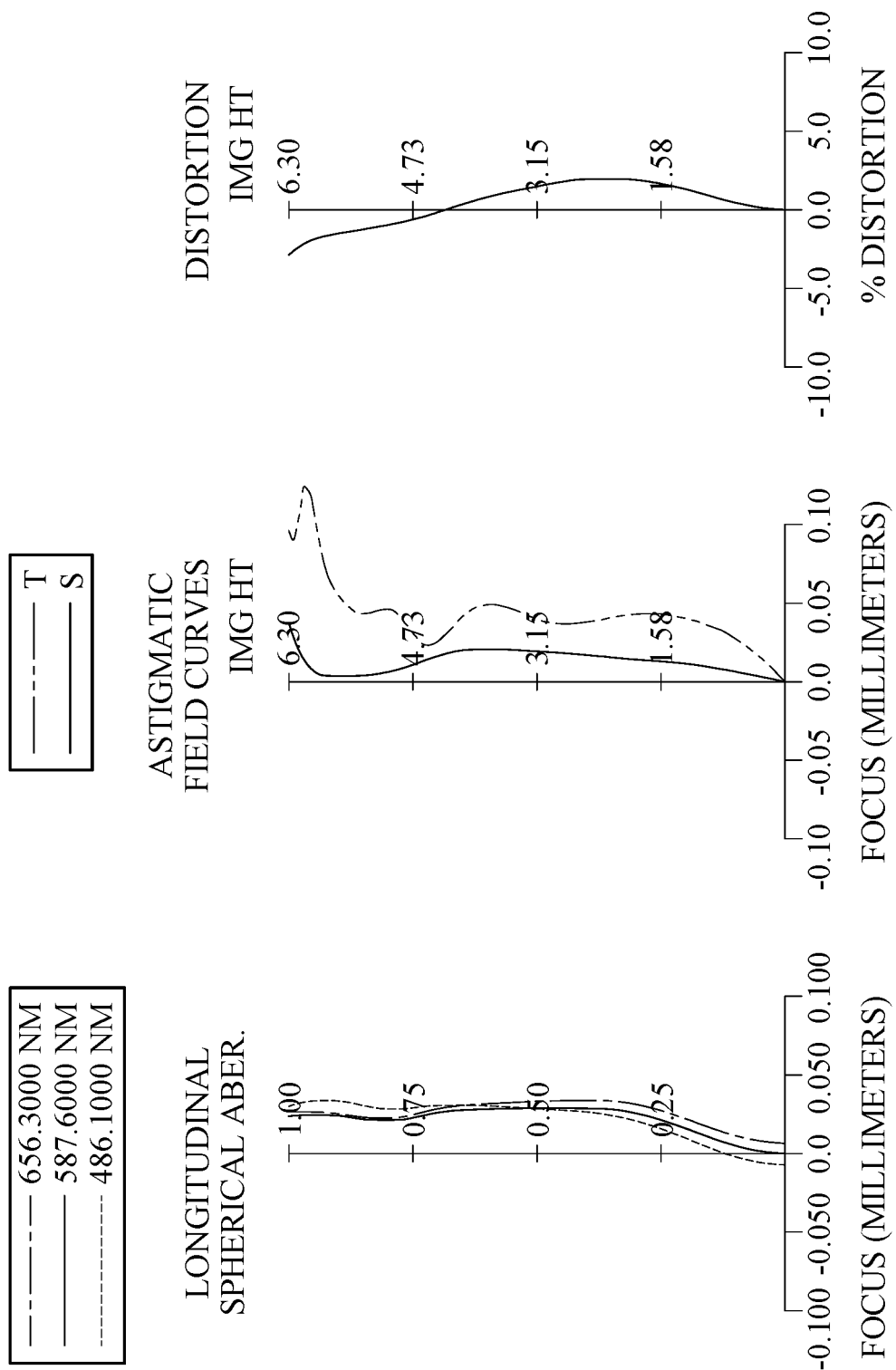
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical lens assembly (its reference numeral is omitted) of the present disclosure and an image sensor 295. The optical lens assembly includes, in order from an object side to an image side, a first lens element 210, a second lens element 220, an aperture stop 200, a third lens element 230, a stop 201, a fourth lens element 240, a fifth lens element 250, a sixth lens element 260, a seventh lens element 270, an IR-cut filter 280 and an image surface 290. The optical lens assembly includes seven lens elements (210, 220, 230, 240, 250, 260 and 270) with no additional lens element disposed between each of the adjacent seven lens elements.

The first lens element 210 with negative refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has at least one convex critical point in an off-axis region thereof. The image-side surface 212 of the first lens element 210 has at least one concave critical point in an off-axis region thereof.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex critical point in an off-axis region thereof.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one convex critical point in an off-axis region thereof.

The IR-cut filter 280 is made of glass material and located between the seventh lens element 270 and the image surface 290, and will not affect the focal length of the optical lens assembly. The image sensor 295 is disposed on or near the image surface 290 of the optical lens assembly.

The detailed optical data of the 2nd embodiment are shown in Table 3 and the aspheric surface data are shown in Table 4 below.

TABLE 3

2nd Embodiment
f = 5.81 mm, Fno = 1.95, HFOV = 48.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −8.160 | (ASP) | 0.363 | Plastic | 1.639 | 23.5 | −60.51 |
| 2 | | −10.524 | (ASP) | 0.056 | | | | |
| 3 | Lens 2 | 2.666 | (ASP) | 0.841 | Plastic | 1.544 | 56.0 | 7.33 |
| 4 | | 7.146 | (ASP) | 0.236 | | | | |
| 5 | Ape. Stop | Plano | | 0.438 | | | | |
| 6 | Lens 3 | −36.826 | (ASP) | 0.629 | Plastic | 1.544 | 56.0 | 11.39 |
| 7 | | −5.335 | (ASP) | −0.343 | | | | |
| 8 | Stop | Plano | | 0.598 | | | | |
| 9 | Lens 4 | −6.535 | (ASP) | 0.440 | Plastic | 1.669 | 19.4 | −13.07 |
| 10 | | −26.591 | (ASP) | 0.508 | | | | |
| 11 | Lens 5 | −8.054 | (ASP) | 0.608 | Plastic | 1.566 | 37.4 | −8.37 |
| 12 | | 11.824 | (ASP) | 0.066 | | | | |
| 13 | Lens 6 | 2.220 | (ASP) | 0.723 | Plastic | 1.544 | 56.0 | 4.18 |
| 14 | | 82.248 | (ASP) | 1.130 | | | | |
| 15 | Lens 7 | 9.083 | (ASP) | 0.650 | Plastic | 1.544 | 56.0 | −5.39 |
| 16 | | 2.162 | (ASP) | 0.700 | | | | |
| 17 | IR-cut Filter | Plano | | 0.210 | Glass | 1.517 | 64.2 | — |
| 18 | | Plano | | 0.277 | | | | |
| 19 | Image | Plano | | 0.000 | | | | |

Note: Reference wavelength is 587.6 nm (d-line).
An effective radius of the stop 201 (Surface 8) is 1.560 mm.
An effective radius of the object-side surface 251 (Surface 11) is 2.430 mm.

TABLE 4

Aspheric Coefficients

| Surface # | 1 | 2 | 3 | 4 | 6 |
|---|---|---|---|---|---|
| k = | −5.6241E+01 | −4.2666E+01 | −1.0123E+00 | 1.3909E+00 | 0.0000E+00 |
| A4 = | 3.9811E−03 | 9.4610E−03 | −1.9406E−03 | −7.5632E−03 | −1.4590E−02 |
| A6 = | 8.7393E−04 | −1.9127E−04 | 5.6364E−03 | −1.9185E−03 | −8.1004E−04 |
| A8 = | −2.4142E−04 | −4.2967E−05 | −4.5608E−03 | 3.3662E−03 | −6.6599E−03 |
| A10 = | 3.2750E−05 | 1.0719E−05 | 2.4304E−03 | −3.7459E−03 | 9.2887E−03 |
| A12 = | −1.4607E−06 | 9.8362E−07 | −8.7300E−04 | 1.6999E−03 | −6.8333E−03 |
| A14 = | — | — | 1.5812E−04 | −3.5849E−04 | 2.4870E−03 |
| A16 = | — | — | −1.1472E−05 | 2.9161E−05 | −3.6564E−04 |

| Surface # | 7 | 9 | 10 | 11 | 12 |
|---|---|---|---|---|---|
| k = | 3.3599E−01 | 0.0000E+00 | 0.0000E+00 | −4.6333E+00 | 0.0000E+00 |
| A4 = | −2.8309E−02 | −4.6236E−02 | −1.6427E−02 | 2.1390E−02 | −9.2824E−02 |
| A6 = | −7.3094E−03 | −3.0579E−03 | −1.0827E−02 | −1.2997E−02 | 3.7291E−02 |
| A8 = | 1.1168E−02 | 6.8490E−03 | 1.1060E−02 | 2.7319E−03 | −1.2834E−02 |
| A10 = | −6.5102E−03 | 4.1325E−04 | −4.9016E−03 | −4.1932E−05 | 3.1619E−03 |
| A12 = | 1.3688E−03 | −2.8119E−03 | 1.1493E−03 | −5.3376E−05 | −4.7023E−04 |
| A14 = | 4.4078E−05 | 1.0711E−03 | −1.5508E−04 | −3.8490E−06 | 4.0132E−05 |
| A16 = | −5.1766E−05 | −1.3194E−04 | 1.1120E−05 | 2.4982E−06 | −1.8298E−06 |
| A18 = | — | — | — | −1.8476E−07 | 3.5128E−08 |

| Surface # | 13 | 14 | 15 | 16 |
|---|---|---|---|---|
| k = | −6.3510E+00 | −8.5060E+01 | 1.9375E−01 | −9.7618E−01 |
| A4 = | 8.3298E−04 | 7.0264E−02 | −5.6665E−02 | −7.0223E−02 |
| A6 = | 2.3041E−03 | −2.7256E−02 | 4.4799E−03 | 1.4451E−02 |

TABLE 4-continued

| Aspheric Coefficients | | | | |
|---|---|---|---|---|
| A8 = | −3.5550E−03 | 5.4115E−03 | 9.5979E−04 | −2.3320E−03 |
| A10 = | 1.1497E−03 | −6.8511E−04 | −2.3504E−04 | 2.6535E−04 |
| A12 = | −2.0087E−04 | 5.7560E−05 | 2.2461E−05 | −2.0370E−05 |
| A14 = | 2.1242E−05 | −3.1621E−06 | −1.1766E−06 | 1.0126E−06 |
| A16 = | −1.3374E−06 | 1.0641E−07 | 3.5257E−08 | −3.0859E−08 |
| A18 = | 4.5862E−08 | −1.9060E−09 | −5.6489E−10 | 5.2097E−10 |
| A20 = | −6.5798E−10 | 1.2794E−11 | 3.7298E−12 | −3.7196E−12 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.81 | f/R13 | 0.64 |
| Fno | 1.95 | f2/f3 | 0.64 |
| HFOV [deg.] | 48.1 | T67/T12 | 20.18 |
| V1/N1 | 14.34 | T67/T23 | 1.34 |
| V2/N2 | 36.26 | T67/T34 | 1.68 |
| V3/N3 | 36.26 | T67/T45 | 1.80 |
| V4/N4 | 11.65 | T67/T56 | 4.43 |
| V5/N5 | 23.91 | Y11/Y72 | 0.55 |
| V6/N6 | 36.26 | Yc11/f | 0.30 |
| V7/N7 | 36.26 | Yc12/f | 0.25 |
| (R11 + R12)/(R11 − R12) | −1.06 | Yc72/f | 0.36 |
| f/R1 | −0.71 | Yc11/Yc72 | 0.83 |
| f/R2 | −0.55 | Y72/BL | 4.22 |
| (f/R1) + (f/R2) | −1.26 | TL/ImgH + cot(FOV) | 1.18 |
| f/R8 | −0.22 | — | — |

3rd Embodiment

Figure 5:
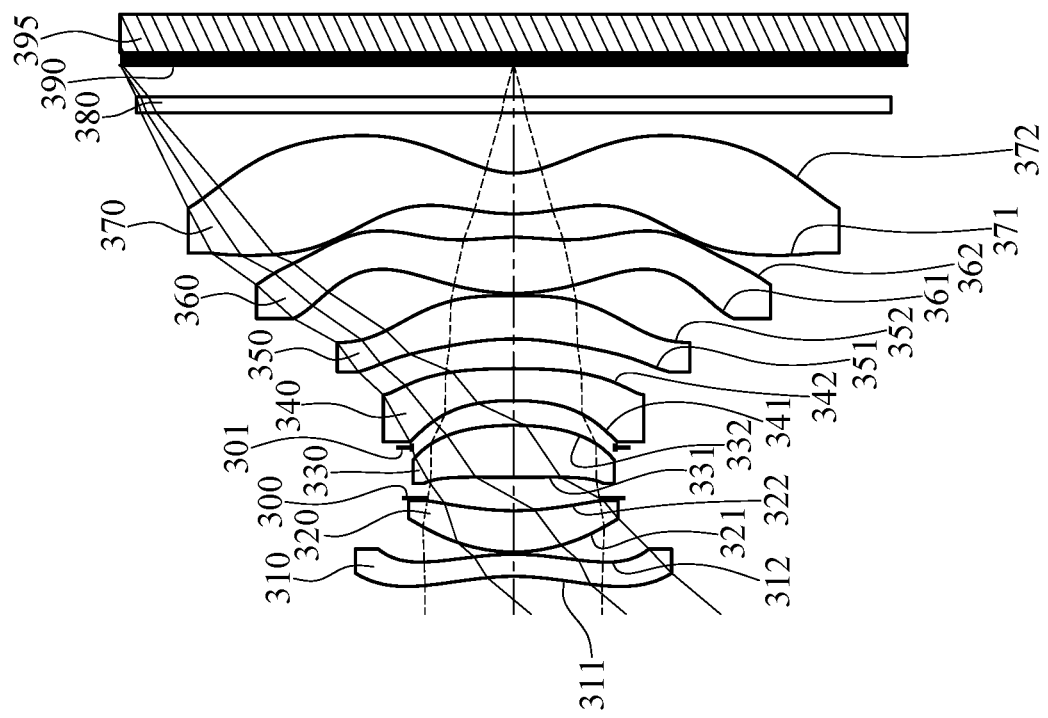
FIG. 5 is a schematic view of an image capturing unit according to the 3rd embodiment of the present disclosure.
Figure 6:
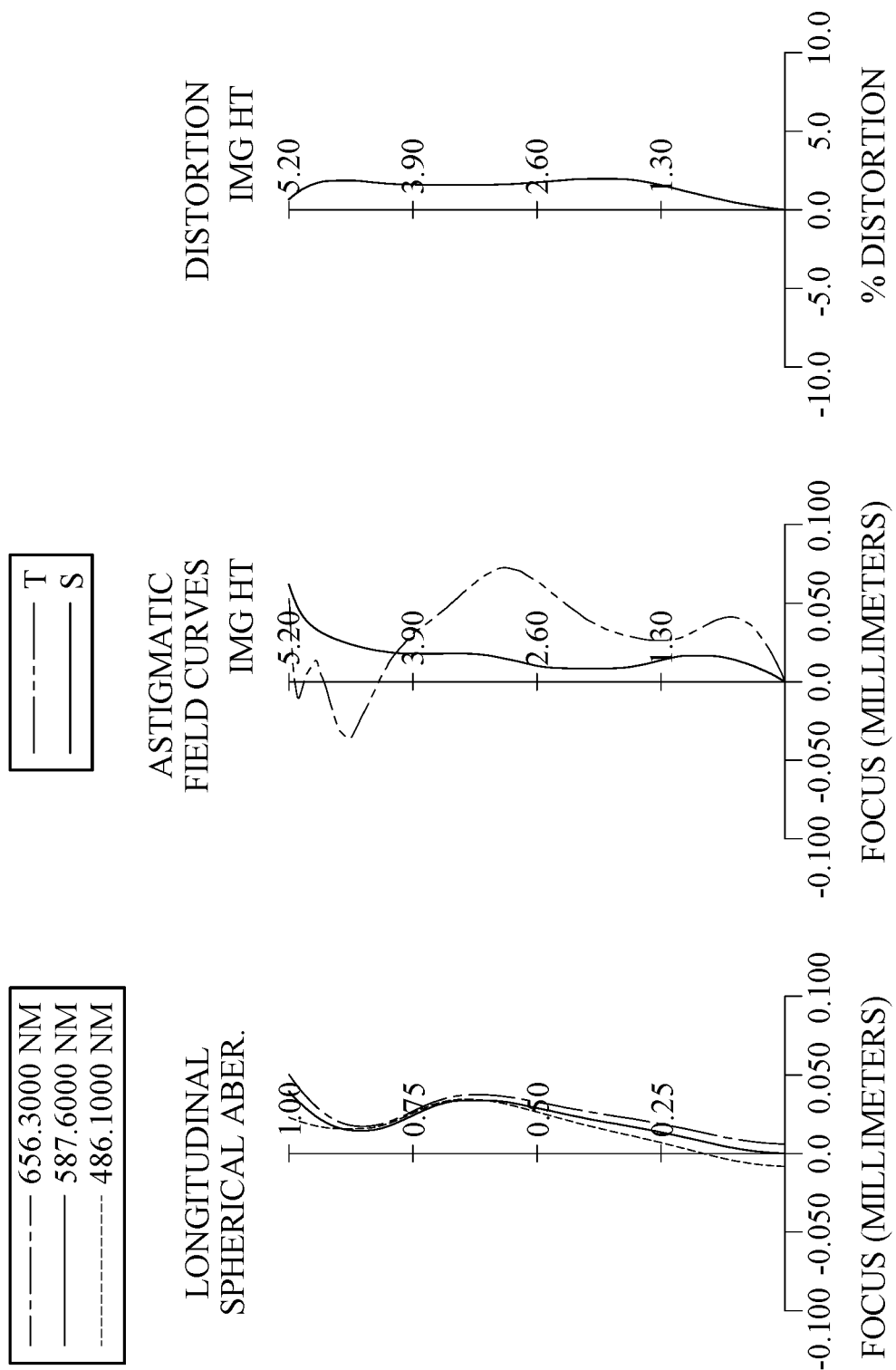
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical lens assembly (its reference numeral is omitted) of the present disclosure and an image sensor 395. The optical lens assembly includes, in order from an object side to an image side, a first lens element 310, a second lens element 320, an aperture stop 300, a third lens element 330, a stop 301, a fourth lens element 340, a fifth lens element 350, a sixth lens element 360, a seventh lens element 370, an IR-cut filter 380 and an image surface 390. The optical lens assembly includes seven lens elements (310, 320, 330, 340, 350, 360 and 370) with no additional lens element disposed between each of the adjacent seven lens elements.

The first lens element 310 with negative refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one convex critical point in an off-axis region thereof. The image-side surface 312 of the first lens element 310 has at least one concave critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one convex critical point in an off-axis region thereof.

The IR-cut filter 380 is made of glass material and located between the seventh lens element 370 and the image surface 390, and will not affect the focal length of the optical lens assembly. The image sensor 395 is disposed on or near the image surface 390 of the optical lens assembly.

The detailed optical data of the 3rd embodiment are shown in Table 5 and the aspheric surface data are shown in Table 6 below.

TABLE 5

3rd Embodiment
f = 4.31 mm, Fno = 1.84, HFOV = 50.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.247 | (ASP) | 0.292 | Plastic | 1.545 | 56.1 | −998.71 |
| 2 | | −3.370 | (ASP) | 0.030 | | | | |
| 3 | Lens 2 | 2.126 | (ASP) | 0.547 | Plastic | 1.544 | 56.0 | 8.51 |
| 4 | | 3.576 | (ASP) | 0.164 | | | | |
| 5 | Ape. Stop | Plano | | 0.277 | | | | |
| 6 | Lens 3 | 33.758 | (ASP) | 0.688 | Plastic | 1.545 | 56.1 | 6.32 |
| 7 | | −3.804 | (ASP) | −0.294 | | | | |
| 8 | Stop | Plano | | 0.621 | | | | |
| 9 | Lens 4 | −3.506 | (ASP) | 0.424 | Plastic | 1.669 | 19.4 | −8.46 |
| 10 | | −9.655 | (ASP) | 0.391 | | | | |
| 11 | Lens 5 | −3.312 | (ASP) | 0.573 | Plastic | 1.566 | 37.4 | −6.85 |
| 12 | | −24.243 | (ASP) | 0.030 | | | | |
| 13 | Lens 6 | 2.550 | (ASP) | 0.744 | Plastic | 1.544 | 56.0 | 2.67 |
| 14 | | −3.018 | (ASP) | 0.308 | | | | |
| 15 | Lens 7 | 2.514 | (ASP) | 0.540 | Plastic | 1.534 | 55.9 | −3.82 |
| 16 | | 1.041 | (ASP) | 0.800 | | | | |
| 17 | IR-cut Filter | Plano | | 0.210 | Glass | 1.517 | 64.2 | — |
| 18 | | Plano | | 0.416 | | | | |
| 19 | Image | Plano | | 0.000 | | | | |

Note: Reference wavelength is 587.6 nm (d-line).
An effective radius of the stop 301 (Surface 8) is 1.345 mm.

TABLE 6

Aspheric Coefficients

| Surface # | 1 | 2 | 3 | 4 | 6 |
|---|---|---|---|---|---|
| k = | −2.1242E+01 | −2.7828E+01 | −6.9498E−01 | 3.1106E+00 | 0.0000E+00 |
| A4 = | 7.3341E−03 | 6.1783E−04 | −1.2062E−02 | −5.5546E−02 | −2.4603E−02 |
| A6 = | 5.1676E−03 | 1.7214E−02 | 1.5905E−03 | 2.2804E−02 | −9.7308E−03 |
| A8 = | −1.1206E−02 | −6.3246E−03 | 5.8845E−03 | −1.5096E−02 | −5.4887E−05 |
| A10 = | 2.1867E−04 | 1.6961E−03 | −2.7756E−03 | 3.1021E−03 | −2.8374E−03 |
| A12 = | −1.9745E−05 | −1.5283E−04 | — | — | −1.2095E−03 |

| Surface # | 7 | 9 | 10 | 11 | 12 |
|---|---|---|---|---|---|
| k = | 1.2249E+00 | 3.1574E+00 | 0.0000E+00 | −1.3054E+01 | 3.3031E+01 |
| A4 = | −5.1650E−02 | −7.4327E−02 | −2.3631E−02 | −1.1392E−02 | −1.8679E−01 |
| A6 = | 9.1723E−04 | −4.7522E−02 | −2.1563E−02 | 4.9336E−02 | 1.3814E−01 |
| A8 = | −6.5242E−03 | 9.6399E−02 | 2.6224E−02 | −6.3282E−02 | −7.8716E−02 |
| A10 = | 3.4852E−03 | −7.8946E−02 | −1.4036E−02 | 4.1623E−02 | 3.0941E−02 |
| A12 = | −1.6474E−03 | 3.1972E−02 | 3.2650E−03 | −1.5925E−02 | −7.4936E−03 |
| A14 = | — | −4.7925E−03 | −2.2460E−04 | 3.4750E−03 | 1.0733E−03 |
| A16 = | — | — | — | −3.9367E−04 | −8.3802E−05 |
| A18 = | — | — | — | 1.7704E−05 | 2.7507E−06 |

| Surface # | 13 | 14 | 15 | 16 |
|---|---|---|---|---|
| k = | −1.7975E+01 | −1.0000E+00 | −1.0000E+00 | −3.5155E+00 |
| A4 = | 4.2469E−02 | 2.3797E−01 | −9.8193E−02 | −5.0894E−02 |
| A6 = | −1.0990E−02 | −1.1787E−01 | 7.7670E−03 | 1.0870E−02 |
| A8 = | −6.4095E−03 | 3.2998E−02 | 1.4671E−03 | −1.9699E−03 |
| A10 = | 3.6779E−03 | −6.1593E−03 | −3.4263E−04 | 3.0709E−04 |
| A12 = | −8.8055E−04 | 7.7023E−04 | 2.8458E−05 | −3.4634E−05 |
| A14 = | 1.1784E−04 | −6.1811E−05 | −1.0377E−06 | 2.5091E−06 |
| A16 = | −8.9718E−06 | 2.9721E−06 | 4.1103E−08 | −1.0951E−07 |
| A18 = | 3.6034E−07 | −7.5481E−08 | 7.9148E−10 | 2.6211E−09 |
| A20 = | −5.9018E−09 | 7.3504E−10 | −1.6541E−11 | −2.6457E−11 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.31 | f/R13 | 1.71 |
| Fno | 1.84 | f2/f3 | 1.35 |
| HFOV [deg.] | 50.1 | T67/T12 | 10.27 |
| V1/N1 | 36.30 | T67/T23 | 0.56 |
| V2/N2 | 36.26 | T67/T34 | 0.70 |
| V3/N3 | 36.30 | T67/T45 | 0.45 |
| V4/N4 | 11.65 | T67/T56 | 0.94 |

-continued

| 3rd Embodiment | | | | |
|---|---|---|---|---|
| V5/N5 | 23.91 | Y11/Y72 | 0.49 |
| V6/N6 | 36.26 | Yc11/f | 0.33 |
| V7/N7 | 36.46 | Yc12/f | 0.29 |
| (R11 + R12)/(R11 − R12) | −0.08 | Yc72/f | 0.46 |
| f/R1 | −1.33 | Yc11/Yc72 | 0.71 |
| f/R2 | −1.28 | Y72/BL | 3.01 |
| (f/R1) + (f/R2) | −2.61 | TL/ImgH + cot(FOV) | 1.12 |
| f/R8 | −0.45 | — | — |

4th Embodiment

Figure 7:
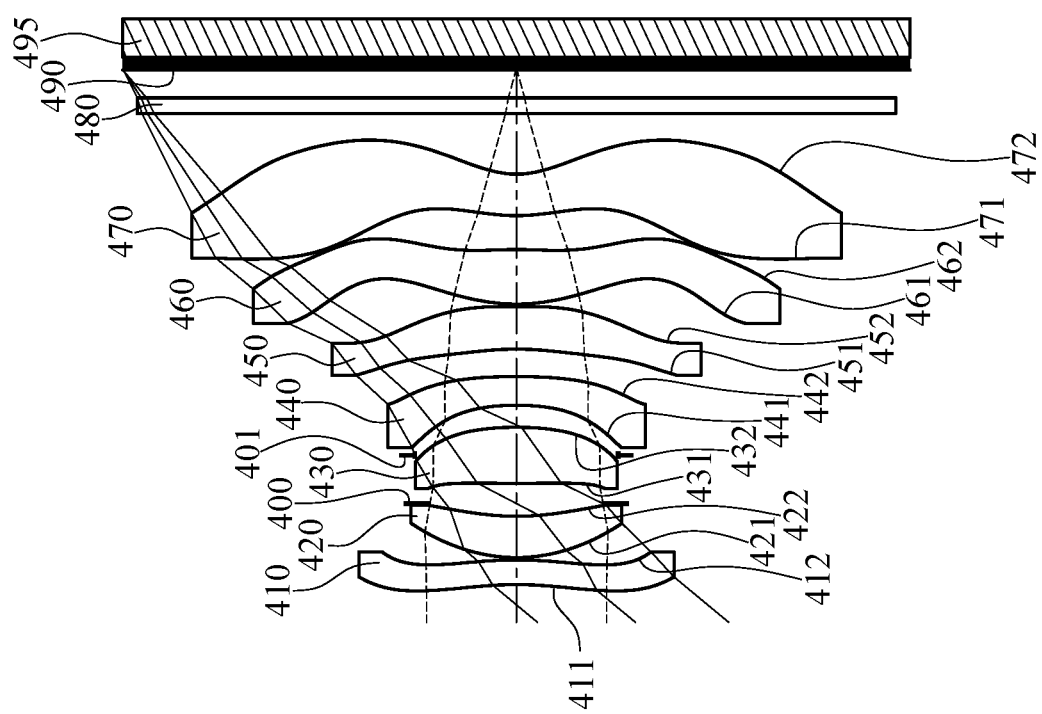
FIG. 7 is a schematic view of an image capturing unit according to the 4th embodiment of the present disclosure.
Figure 8:
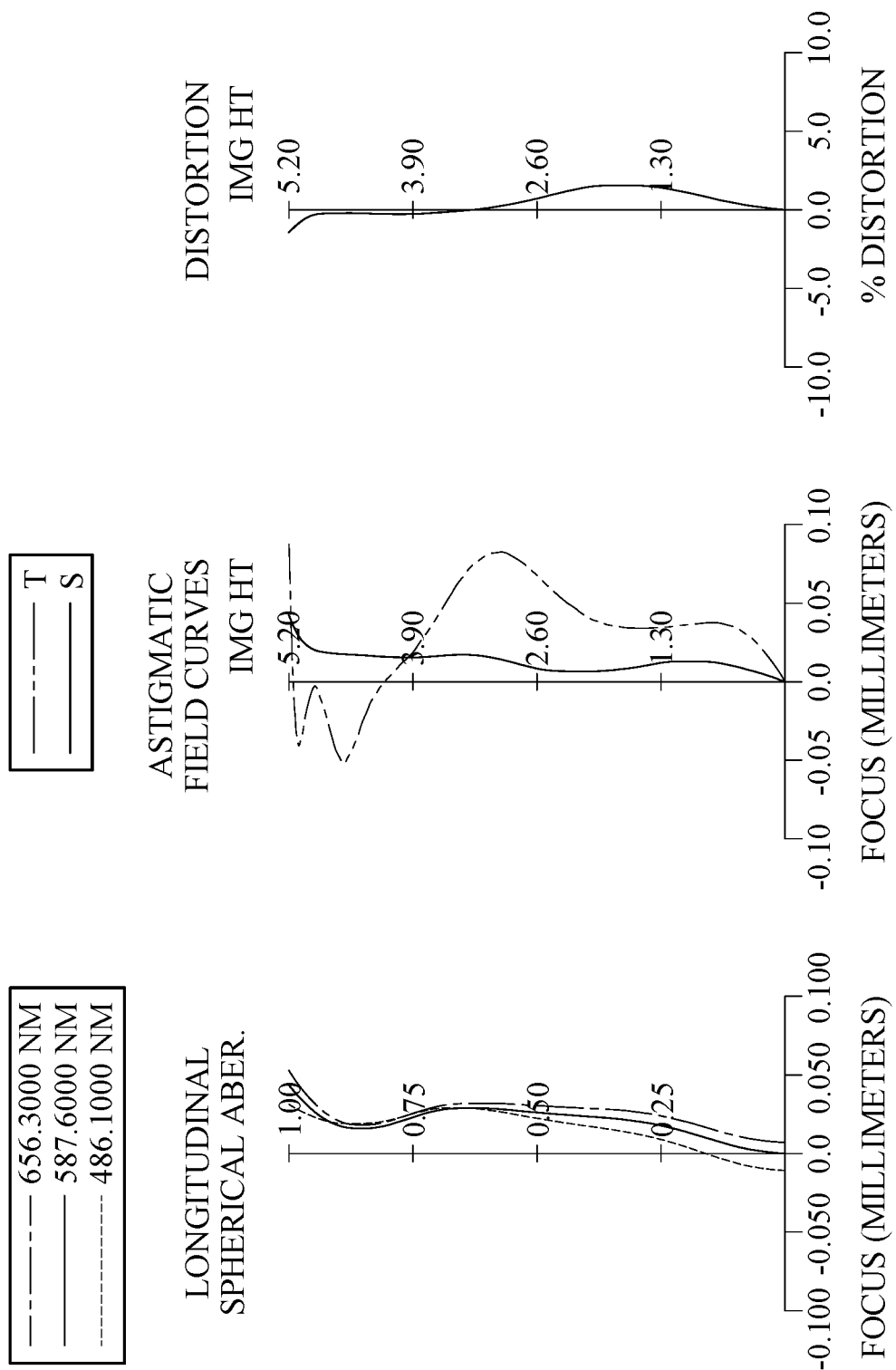
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical lens assembly (its reference numeral is omitted) of the present disclosure and an image sensor 495. The optical lens assembly includes, in order from an object side to an image side, a first lens element 410, a second lens element 420, an aperture stop 400, a third lens element 430, a stop 401, a fourth lens element 440, a fifth lens element 450, a sixth lens element 460, a seventh lens element 470, an IR-cut filter 480 and an image surface 490. The optical lens assembly includes seven lens elements (410, 420, 430, 440, 450, 460 and 470) with no additional lens element disposed between each of the adjacent seven lens elements.

The first lens element 410 with negative refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one convex critical point in an off-axis region thereof. The image-side surface 412 of the first lens element 410 has at least one concave critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The image-side surface 472 of the seventh lens element 470 has at least one convex critical point in an off-axis region thereof.

The IR-cut filter 480 is made of glass material and located between the seventh lens element 470 and the image surface 490, and will not affect the focal length of the optical lens assembly. The image sensor 495 is disposed on or near the image surface 490 of the optical lens assembly.

The detailed optical data of the 4th embodiment are shown in Table 7 and the aspheric surface data are shown in Table 8 below.

TABLE 7

4th Embodiment
f = 4.37 mm, Fno = 1.84, HFOV = 50.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.403 | (ASP) | 0.327 | Plastic | 1.545 | 56.1 | −803.98 |
| 2 | | −4.564 | (ASP) | 0.030 | | | | |
| 3 | Lens 2 | 2.134 | (ASP) | 0.547 | Plastic | 1.544 | 56.0 | 8.96 |
| 4 | | 3.451 | (ASP) | 0.167 | | | | |
| 5 | Ape. Stop | Plano | | 0.269 | | | | |
| 6 | Lens 3 | 27.483 | (ASP) | 0.741 | Plastic | 1.545 | 56.1 | 6.66 |
| 7 | | −4.138 | (ASP) | −0.368 | | | | |
| 8 | Stop | Plano | | 0.659 | | | | |
| 9 | Lens 4 | −3.421 | (ASP) | 0.380 | Plastic | 1.669 | 19.4 | −9.52 |
| 10 | | −7.719 | (ASP) | 0.363 | | | | |
| 11 | Lens 5 | −3.712 | (ASP) | 0.565 | Plastic | 1.566 | 37.4 | −8.45 |
| 12 | | −17.481 | (ASP) | 0.030 | | | | |
| 13 | Lens 6 | 2.325 | (ASP) | 0.722 | Plastic | 1.544 | 56.0 | 3.18 |
| 14 | | −5.982 | (ASP) | 0.449 | | | | |
| 15 | Lens 7 | 2.542 | (ASP) | 0.548 | Plastic | 1.534 | 55.9 | −4.52 |

TABLE 7-continued

4th Embodiment
f = 4.37 mm, Fno = 1.84, HFOV = 50.3 deg.

| Surface # | | Curvature Radius | Thickness | Material | Index | Abbe # | Focal Length |
|---|---|---|---|---|---|---|---|
| 16 | | 1.146 (ASP) | 0.800 | | | | |
| 17 | IR-cut Filter | Plano | 0.210 | Glass | 1.517 | 64.2 | — |
| 18 | | Plano | 0.369 | | | | |
| 19 | Image | Plano | 0.000 | | | | |

Note: Reference wavelength is 587.6 nm (d-line).
An effective radius of the stop 401 (Surface 8) is 1.345 mm.

TABLE 8

Aspheric Coefficients

| Surface # | 1 | 2 | 3 | 4 | 6 |
|---|---|---|---|---|---|
| k = | −4.3472E+01 | −5.9347E+01 | −9.3571E−01 | 2.1877E+00 | 0.0000E+00 |
| A4 = | 6.2859E−03 | −2.3508E−03 | −1.0308E−02 | −4.8113E−02 | −2.5281E−02 |
| A6 = | 6.6979E−03 | 2.1778E−02 | 5.4050E−03 | 1.6940E−02 | −3.4735E−03 |
| A8 = | −2.5008E−03 | −1.0305E−02 | 1.7057E−03 | −1.1513E−02 | −1.4926E−02 |
| A10 = | 6.0267E−04 | 2.9771E−03 | −1.0833E−03 | 2.3899E−03 | 1.1137E−02 |
| A12 = | −5.5874E−05 | −3.0262E−04 | — | — | −5.9698E−03 |

| Surface # | 7 | 9 | 10 | 11 | 12 |
|---|---|---|---|---|---|
| k = | 1.0405E−01 | 3.6614E+00 | 6.4162E−01 | −3.0861E+01 | 0.0000E+00 |
| A4 = | −5.3070E−02 | −6.8940E−02 | −9.7034E−03 | 3.4401E−03 | −1.3967E−01 |
| A6 = | −1.4149E−02 | −4.5949E−02 | −3.9932E−02 | 3.8682E−02 | 9.7860E−02 |
| A8 = | 7.0326E−03 | 6.1436E−02 | 3.1208E−02 | −5.6039E−02 | −4.9396E−02 |
| A10 = | −1.3710E−03 | −2.3584E−02 | −1.1211E−02 | 3.5454E−02 | 1.6985E−02 |
| A12 = | −1.0789E−03 | 1.8000E−03 | 1.6063E−03 | −1.2695E−02 | −3.5825E−03 |
| A14 = | — | 8.9370E−04 | 1.0838E−05 | 2.6028E−03 | 4.4527E−04 |
| A16 = | — | — | — | −2.7991E−04 | −3.0169E−05 |
| A18 = | — | — | — | 1.2058E−05 | 8.6178E−07 |

| Surface # | 13 | 14 | 15 | 16 |
|---|---|---|---|---|
| k = | −1.2259E+01 | −1.5241E+00 | −1.0000E+00 | −3.2686E+00 |
| A4 = | 3.7530E−02 | 1.7636E−01 | −1.2534E−01 | −6.9041E−02 |
| A6 = | −1.6368E−02 | −9.2704E−02 | 2.2475E−02 | 2.0771E−02 |
| A8 = | −8.7281E−04 | 2.7388E−02 | −2.1563E−03 | −4.7359E−03 |
| A10 = | 1.3730E−03 | −5.5326E−03 | 1.7945E−04 | 7.5532E−04 |
| A12 = | −3.5097E−04 | 7.6807E−04 | −1.8923E−05 | −7.9125E−05 |
| A14 = | 4.7543E−05 | −7.0322E−05 | 1.6924E−06 | 5.2512E−06 |
| A16 = | −3.6402E−06 | 4.0072E−06 | −9.1746E−08 | −2.1154E−07 |
| A18 = | 1.4649E−07 | −1.2820E−07 | 2.6253E−09 | 4.7122E−09 |
| A20 = | −2.3948E−09 | 1.7574E−09 | −3.0664E−11 | −4.4496E−11 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.37 | f/R13 | 1.72 |
| Fno | 1.84 | f2/f3 | 1.35 |
| HFOV [deg.] | 50.3 | T67/T12 | 14.97 |
| V1/N1 | 36.30 | T67/T23 | 0.82 |
| V2/N2 | 36.26 | T67/T34 | 1.03 |
| V3/N3 | 36.30 | T67/T45 | 0.61 |
| V4/N4 | 11.65 | T67/T56 | 1.54 |
| V5/N5 | 23.91 | Y11/Y72 | 0.48 |

-continued

| 4th Embodiment | | | |
|---|---|---|---|
| V6/N6 | 36.26 | Yc11/f | 0.30 |
| V7/N7 | 36.46 | Yc12/f | 0.26 |
| (R11 + R12)/(R11 − R12) | −0.44 | Yc72/f | 0.44 |
| f/R1 | −0.99 | Yc11/Yc72 | 0.68 |
| f/R2 | −0.96 | Y72/BL | 3.11 |
| (f/R1) + (f/R2) | −1.95 | TL/ImgH + cot(FOV) | 1.12 |
| f/R8 | −0.57 | — | — |

5th Embodiment

Figure 9:
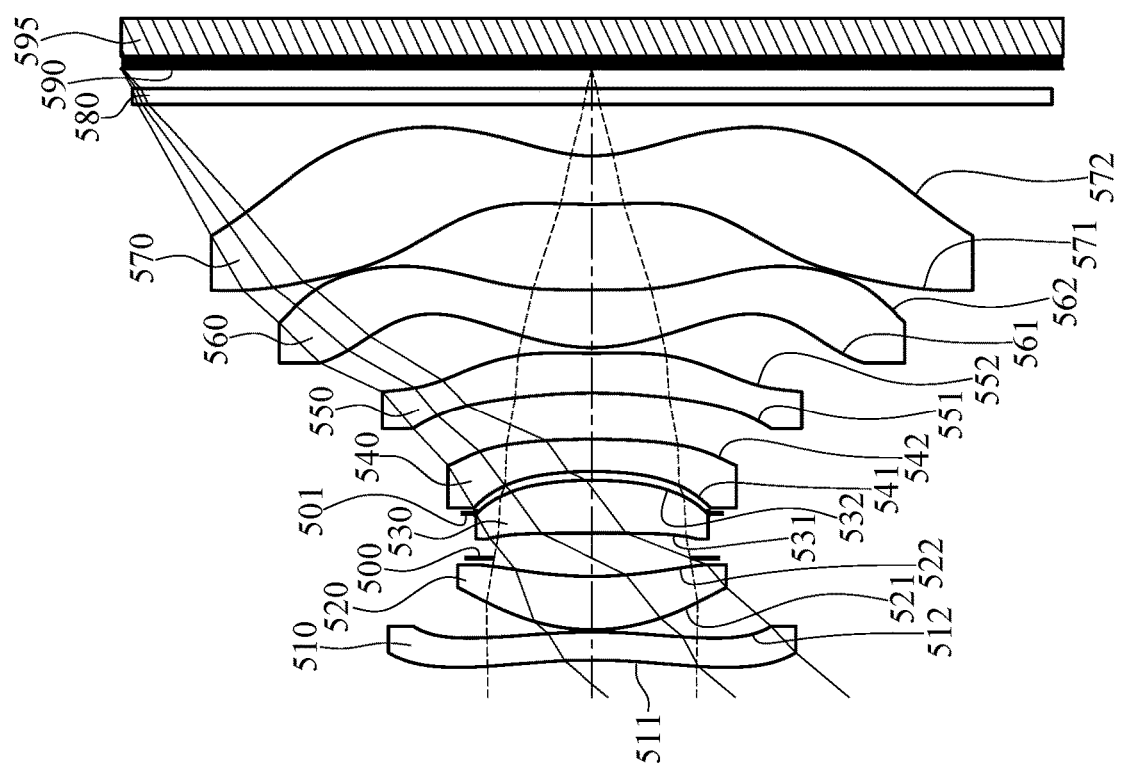
FIG. 9 is a schematic view of an image capturing unit according to the 5th embodiment of the present disclosure.
Figure 10:
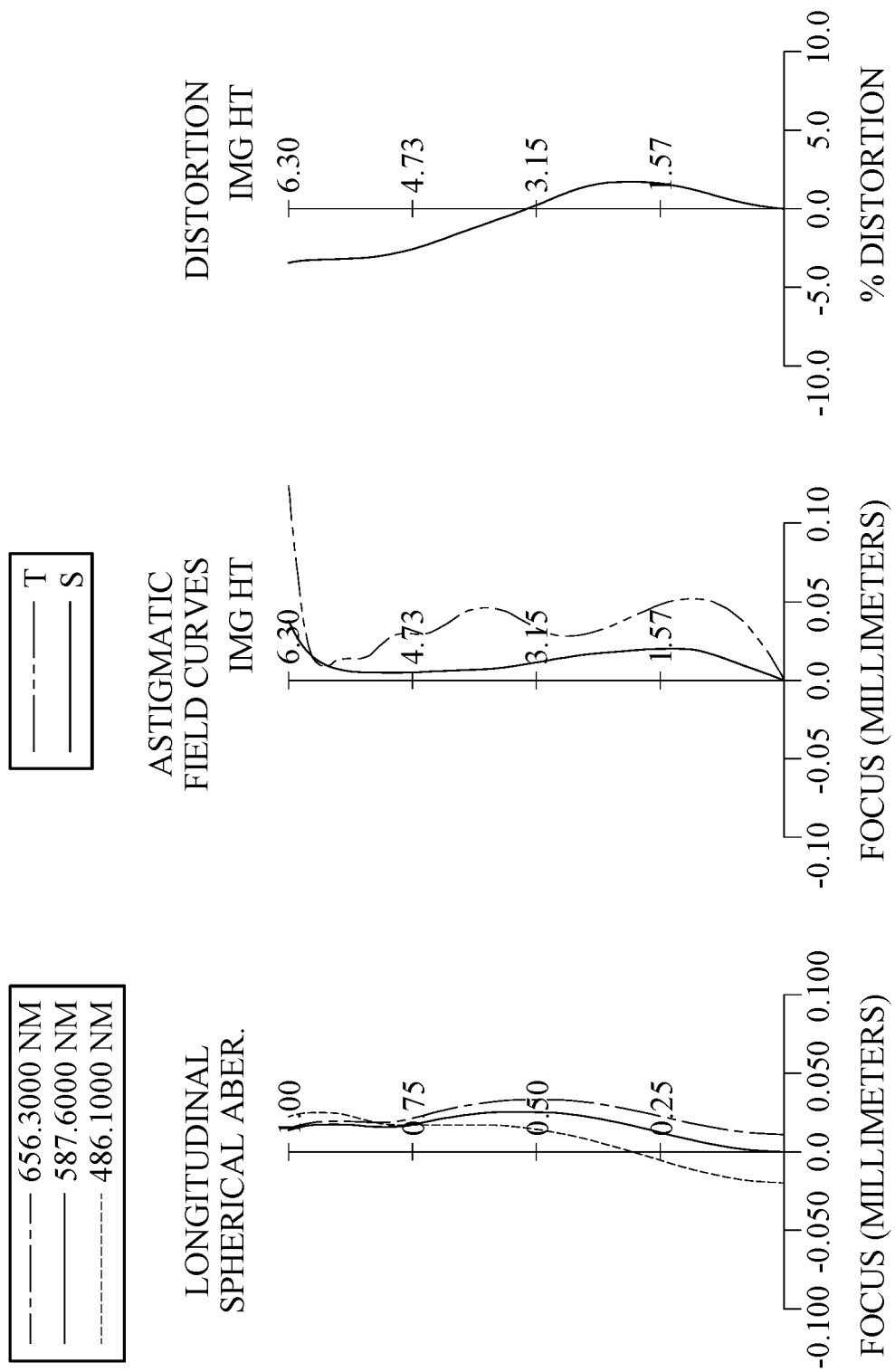
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical lens assembly (its reference numeral is omitted) of the present disclosure and an image sensor 595. The optical lens assembly includes, in order from an object side to an image side, a first lens element 510, a second lens element 520, an aperture stop 500, a third lens element 530, a stop 501, a fourth lens element 540, a fifth lens element 550, a sixth lens element 560, a seventh lens element 570, an IR-cut filter 580 and an image surface 590. The optical lens assembly includes seven lens elements (510, 520, 530, 540, 550, 560 and 570) with no additional lens element disposed between each of the adjacent seven lens elements.

The first lens element 510 with negative refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has at least one convex critical point in an off-axis region thereof. The image-side surface 512 of the first lens element 510 has at least one concave critical point in an off-axis region thereof.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axis region thereof.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one convex critical point in an off-axis region thereof.

The IR-cut filter 580 is made of glass material and located between the seventh lens element 570 and the image surface 590, and will not affect the focal length of the optical lens assembly. The image sensor 595 is disposed on or near the image surface 590 of the optical lens assembly.

The detailed optical data of the 5th embodiment are shown in Table 9 and the aspheric surface data are shown in Table 10 below.

TABLE 9

5th Embodiment
f = 5.47 mm, Fno = 1.95, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.454 | (ASP) | 0.379 | Plastic | 1.545 | 56.1 | −617.03 |
| 2 | | −7.760 | (ASP) | 0.030 | | | | |
| 3 | Lens 2 | 2.723 | (ASP) | 0.714 | Plastic | 1.544 | 55.9 | 9.39 |
| 4 | | 5.290 | (ASP) | 0.243 | | | | |
| 5 | Ape. Stop | Plano | | 0.338 | | | | |
| 6 | Lens 3 | −306.955 | (ASP) | 0.708 | Plastic | 1.544 | 55.9 | 10.10 |
| 7 | | −5.404 | (ASP) | −0.445 | | | | |
| 8 | Stop | Plano | | 0.562 | | | | |
| 9 | Lens 4 | −5.609 | (ASP) | 0.430 | Plastic | 1.669 | 19.4 | −17.02 |
| 10 | | −11.394 | (ASP) | 0.626 | | | | |
| 11 | Lens 5 | −7.357 | (ASP) | 0.532 | Plastic | 1.569 | 38.5 | −8.27 |
| 12 | | 13.413 | (ASP) | 0.075 | | | | |
| 13 | Lens 6 | 2.348 | (ASP) | 0.778 | Plastic | 1.544 | 55.9 | 4.07 |
| 14 | | −33.630 | (ASP) | 1.142 | | | | |
| 15 | Lens 7 | 8.589 | (ASP) | 0.650 | Plastic | 1.534 | 55.9 | −5.18 |
| 16 | | 2.035 | (ASP) | 0.700 | | | | |
| 17 | IR-cut Filter | Plano | | 0.210 | Glass | 1.517 | 64.2 | — |
| 18 | | Plano | | 0.265 | | | | |
| 19 | Image | Plano | | 0.000 | | | | |

Note: Reference wavelength is 587.6 nm (d-line).
An effective radius of the stop 501 (Surface 8) is 1.560 mm.

TABLE 10

Aspheric Coefficients

| Surface # | 1 | 2 | 3 | 4 | 6 |
|---|---|---|---|---|---|
| k = | −5.6241E+01 | −4.2666E+01 | −1.0123E+00 | 1.3909E+00 | 0.0000E+00 |
| A4 = | 1.4679E−03 | 4.6718E−03 | −2.6237E−03 | −1.2487E−02 | −1.2264E−02 |
| A6 = | 1.7145E−03 | 1.4068E−03 | 3.4813E−03 | 2.6265E−03 | −1.8400E−03 |
| A8 = | −3.9613E−04 | −4.0457E−04 | −1.2956E−03 | −2.5288E−03 | −2.7054E−03 |
| A10 = | 4.9301E−05 | 5.7770E−05 | 6.4402E−05 | 4.6530E−04 | 2.6840E−03 |
| A12 = | −2.0201E−06 | −9.8779E−07 | — | — | −1.4531E−03 |
| A14 = | — | — | — | — | 2.6292E−04 |

| Surface # | 7 | 9 | 10 | 11 | 12 |
|---|---|---|---|---|---|
| k = | 3.3599E−01 | 0.0000E+00 | 0.0000E+00 | −4.6333E+00 | 0.0000E+00 |
| A4 = | −2.9879E−02 | −3.1751E−02 | −3.1265E−03 | 6.0550E−03 | −9.7259E−02 |
| A6 = | −1.1611E−02 | −9.0398E−03 | −1.1460E−02 | 1.1649E−02 | 3.8504E−02 |
| A8 = | 1.1090E−02 | 1.4305E−03 | 7.6802E−03 | −3.1736E−03 | −1.1587E−02 |
| A10 = | −4.3148E−03 | 6.5961E−03 | −3.5478E−03 | 1.3039E−03 | 2.4582E−03 |
| A12 = | 4.2582E−04 | −5.2403E−03 | 9.9790E−04 | −2.1913E−04 | −3.0601E−04 |
| A14 = | — | 1.3566E−03 | −1.7845E−04 | 8.0111E−07 | 1.9518E−05 |
| A16 = | — | −1.0999E−04 | 1.6885E−05 | 3.9094E−06 | −4.5860E−07 |
| A18 = | — | — | — | −3.1833E−07 | −3.1116E−09 |

| Surface # | 13 | 14 | 15 | 16 |
|---|---|---|---|---|
| k = | −6.3510E+00 | −8.5060E+01 | 1.9375E−01 | −9.7618E−01 |
| A4 = | 8.6976E−04 | 7.8388E−02 | −5.5010E−02 | −7.1970E−02 |
| A6 = | 2.7506E−03 | −2.9372E−02 | 4.0943E−03 | 1.4814E−02 |
| A8 = | −3.2007E−03 | 5.9427E−03 | 7.2270E−04 | −2.3820E−03 |
| A10 = | 9.7859E−04 | −7.9493E−04 | −1.6344E−04 | 2.6378E−04 |
| A12 = | −1.6391E−04 | 7.2587E−05 | 1.4326E−05 | −1.9345E−05 |
| A14 = | 1.6529E−05 | −4.4533E−06 | −6.9605E−07 | 9.1384E−07 |
| A16 = | −9.8749E−07 | 1.7471E−07 | 1.9627E−08 | −2.6583E−08 |
| A18 = | 3.2080E−08 | −3.9573E−09 | −3.0046E−10 | 4.3212E−10 |
| A20 = | −4.3626E−10 | 3.9506E−11 | 1.9261E−12 | −3.0008E−12 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.47 | f/R13 | 0.64 |
| Fno | 1.95 | f2/f3 | 0.93 |
| HFOV [deg.] | 50.0 | T67/T12 | 38.07 |
| V1/N1 | 36.30 | T67/T23 | 1.60 |
| V2/N2 | 36.20 | T67/T34 | 1.97 |
| V3/N3 | 36.20 | T67/T45 | 1.61 |
| V4/N4 | 11.62 | T67/T56 | 9.76 |
| V5/N5 | 24.52 | Y11/Y72 | 0.53 |
| V6/N6 | 36.20 | Yc11/f | 0.33 |
| V7/N7 | 36.46 | Yc12/f | 0.30 |
| (R11 + R12)/(R11 − R12) | −0.87 | Yc72/f | 0.40 |
| f/R1 | −0.73 | Yc11/Yc72 | 0.82 |
| f/R2 | −0.70 | Y72/BL | 4.34 |
| (f/R1) + (f/R2) | −1.44 | TL/ImgH + cot(FOV) | 1.08 |
| f/R8 | −0.48 | — | — |

6th Embodiment

Figure 11:
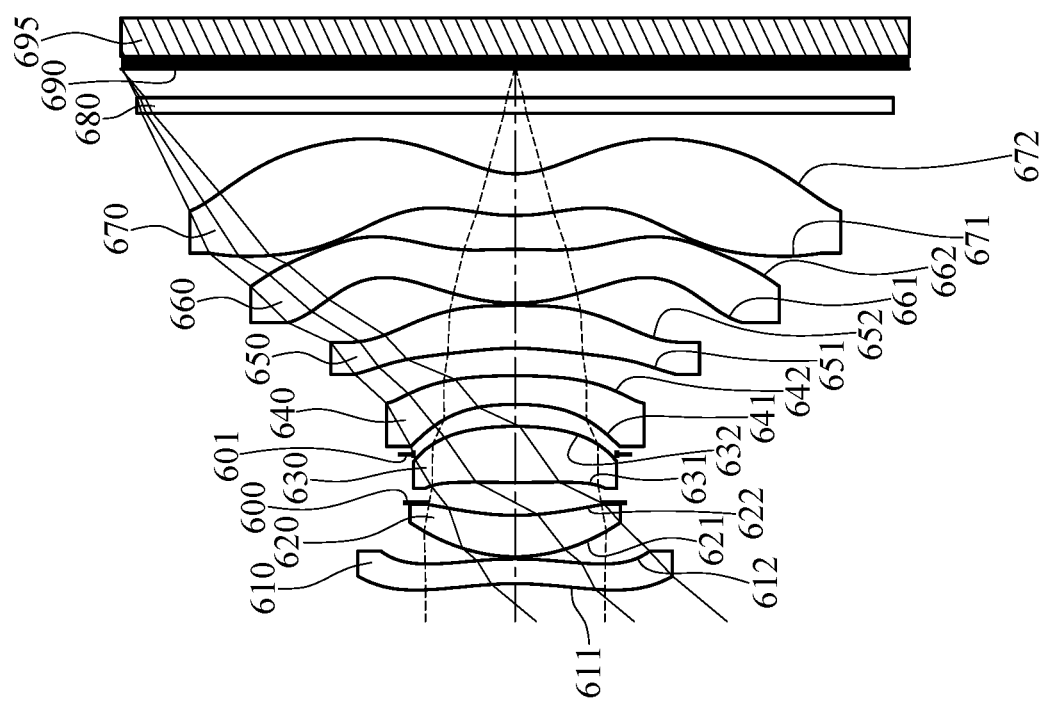
FIG. 11 is a schematic view of an image capturing unit according to the 6th embodiment of the present disclosure.
Figure 12:
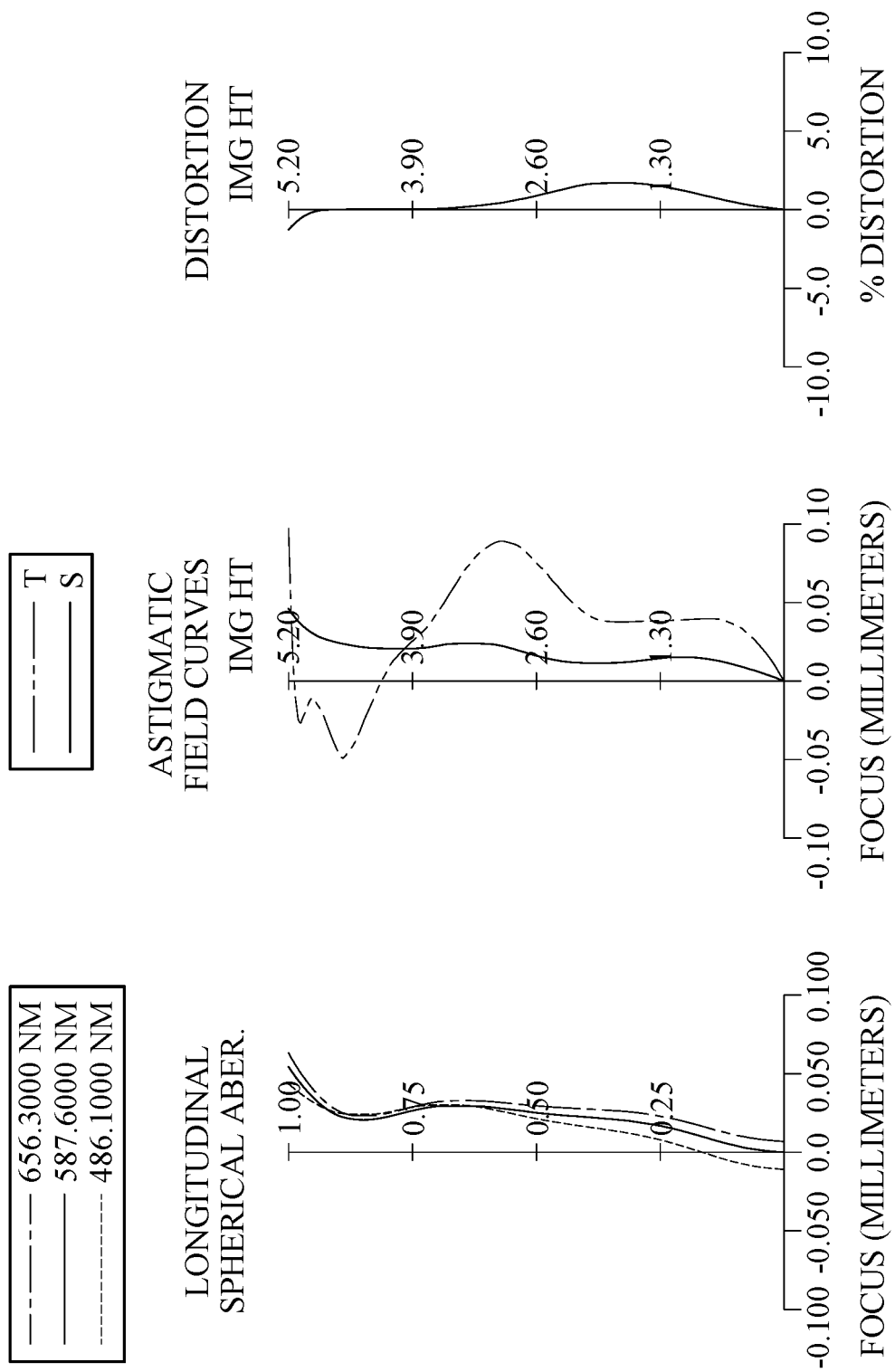
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical lens assembly (its reference numeral is omitted) of the present disclosure and an image sensor 695. The optical lens assembly includes, in order from an object side to an image side, a first lens element 610, a second lens element 620, an aperture stop 600, a third lens element 630, a stop 601, a fourth lens element 640, a fifth lens element 650, a sixth lens element 660, a seventh lens element 670, an IR-cut filter 680 and an image surface 690. The optical lens assembly includes seven lens elements (610, 620, 630, 640, 650, 660 and 670) with no additional lens element disposed between each of the adjacent seven lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has at least one convex critical point in an off-axis region thereof. The image-side surface 612 of the first lens element 610 has at least one concave critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one convex critical point in an off-axis region thereof.

The IR-cut filter 680 is made of glass material and located between the seventh lens element 670 and the image surface 690, and will not affect the focal length of the optical lens assembly. The image sensor 695 is disposed on or near the image surface 690 of the optical lens assembly.

The detailed optical data of the 6th embodiment are shown in Table 11 and the aspheric surface data are shown in Table 12 below.

TABLE 11

6th Embodiment
f = 4.37 mm, Fno = 1.84, HFOV = 50.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.403 | (ASP) | 0.327 | Plastic | 1.545 | 56.1 | −803.98 |
| 2 | | −4.564 | (ASP) | 0.030 | | | | |
| 3 | Lens 2 | 2.134 | (ASP) | 0.547 | Plastic | 1.544 | 56.0 | 8.96 |
| 4 | | 3.451 | (ASP) | 0.167 | | | | |
| 5 | Ape. Stop | Plano | | 0.269 | | | | |
| 6 | Lens 3 | 27.483 | (ASP) | 0.741 | Plastic | 1.545 | 56.1 | 6.66 |
| 7 | | −4.138 | (ASP) | −0.368 | | | | |
| 8 | Stop | Plano | | 0.659 | | | | |
| 9 | Lens 4 | −3.421 | (ASP) | 0.380 | Plastic | 1.669 | 19.4 | −9.52 |
| 10 | | −7.719 | (ASP) | 0.363 | | | | |
| 11 | Lens 5 | −3.712 | (ASP) | 0.565 | Plastic | 1.566 | 37.4 | −8.45 |
| 12 | | −17.481 | (ASP) | 0.031 | | | | |
| 13 | Lens 6 | 2.328 | (ASP) | 0.713 | Plastic | 1.544 | 56.0 | 3.20 |
| 14 | | −6.171 | (ASP) | 0.446 | | | | |
| 15 | Lens 7 | 2.450 | (ASP) | 0.551 | Plastic | 1.534 | 55.9 | −4.63 |
| 16 | | 1.134 | (ASP) | 0.800 | | | | |
| 17 | IR-cut Filter | Plano | | 0.210 | Glass | 1.517 | 64.2 | — |
| 18 | | Plano | | 0.376 | | | | |
| 19 | Image | Plano | | 0.000 | | | | |

Note: Reference wavelength is 587.6 nm (d-line).
An effective radius of the stop 601 (Surface 8) is 1.345 mm.

TABLE 12

Aspheric Coefficients

| Surface # | 1 | 2 | 3 | 4 | 6 |
|---|---|---|---|---|---|
| k = | −4.3472E+01 | −5.9347E+01 | −9.3571E−01 | 2.1877E+00 | 0.0000E+00 |
| A4 = | 6.2859E−03 | −2.3508E−03 | −1.0308E−02 | −4.8113E−02 | −2.5281E−02 |
| A6 = | 6.6979E−03 | 2.1778E−02 | 5.4050E−03 | 1.6940E−02 | −3.4735E−03 |
| A8 = | −2.5008E−03 | −1.0305E−02 | 1.7057E−03 | −1.1513E−02 | −1.4926E−02 |
| A10 = | 6.0267E−04 | 2.9771E−03 | −1.0833E−03 | 2.3899E−03 | 1.1137E−02 |
| A12 = | −5.5874E−05 | −3.0262E−04 | — | — | −5.9698E−03 |

| Surface # | 7 | 9 | 10 | 11 | 12 |
|---|---|---|---|---|---|
| k = | 1.0405E−01 | 3.6614E+00 | 6.4162E−01 | −3.0861E+01 | 0.0000E+00 |
| A4 = | −5.3070E−02 | −6.8940E−02 | −9.7034E−02 | 3.4401E−03 | −1.3967E−01 |
| A6 = | −1.4149E−02 | −4.5949E−02 | −3.9932E−02 | 3.8682E−02 | 9.7860E−02 |
| A8 = | 7.0326E−03 | 6.1436E−02 | 3.1208E−02 | −5.6039E−02 | −4.9396E−02 |
| A10 = | −1.3710E−03 | −2.3584E−02 | −1.1211E−02 | 3.5454E−02 | 1.6985E−02 |
| A12 = | −1.0789E−03 | 1.8000E−03 | 1.6063E−03 | −1.2695E−02 | −3.5825E−03 |
| A14 = | — | 8.9370E−04 | 1.0838E−05 | 2.6028E−03 | 4.4527E−04 |

TABLE 12-continued

| Aspheric Coefficients | | | | | |
|---|---|---|---|---|---|
| A16 = | — | — | — | −2.7991E−04 | −3.0169E−05 |
| A18 = | — | — | — | 1.2058E−05 | 8.6178E−07 |

| Surface # | 13 | 14 | 15 | 16 |
|---|---|---|---|---|
| k = | −1.1701E+01 | −1.1198E+01 | −1.0226E+00 | −3.1217E+00 |
| A4 = | 3.8280E−02 | 1.7963E−01 | −1.2023E−01 | −7.0959E−02 |
| A6 = | −1.5901E−02 | −9.7538E−02 | 1.9363E−02 | 2.2024E−02 |
| A8 = | −1.5116E−03 | 2.9245E−02 | −1.2025E−03 | −5.2545E−03 |
| A10 = | 1.5045E−03 | −5.9894E−03 | 1.0330E−05 | 8.7566E−04 |
| A12 = | −3.3410E−04 | 8.4970E−04 | −1.0927E−06 | −9.5824E−05 |
| A14 = | 3.7748E−05 | −8.0460E−05 | 5.6537E−07 | 6.6720E−06 |
| A16 = | −2.1907E−06 | 4.7970E−06 | −5.0377E−08 | −2.8398E−07 |
| A18 = | 5.1354E−08 | −1.6211E−07 | 1.8356E−09 | 6.7365E−09 |
| A20 = | 8.1427E−14 | 2.3649E−09 | −2.4996E−11 | −6.8265E−11 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.37 | f/R13 | 1.78 |
| Fno | 1.94 | f2/f3 | 1.35 |
| HFOV [deg.] | 50.3 | T67/T12 | 14.87 |
| V1/N1 | 36.30 | T67/T23 | 0.82 |
| V2/N2 | 36.26 | T67/T34 | 1.02 |
| V3/N3 | 36.30 | T67/T45 | 0.60 |
| V4/N4 | 11.65 | T67/T56 | 1.53 |
| V5/N5 | 23.91 | Y11/Y72 | 0.47 |
| V6/N6 | 36.26 | Yc11/f | 0.30 |
| V7/N7 | 36.46 | Yc12/f | 0.26 |
| (R11 + R12)/(R11 − R12) | −0.45 | Yc72/f | 0.45 |
| f/R1 | −0.99 | Yc11/Yc72 | 0.68 |
| f/R2 | −0.96 | Y72/BL | 3.10 |
| (f/R1) + (f/R2) | −1.95 | TL/ImgH + cot(FOV) | 1.12 |
| f/R8 | −0.57 | — | — |

7th Embodiment

Figure 13:
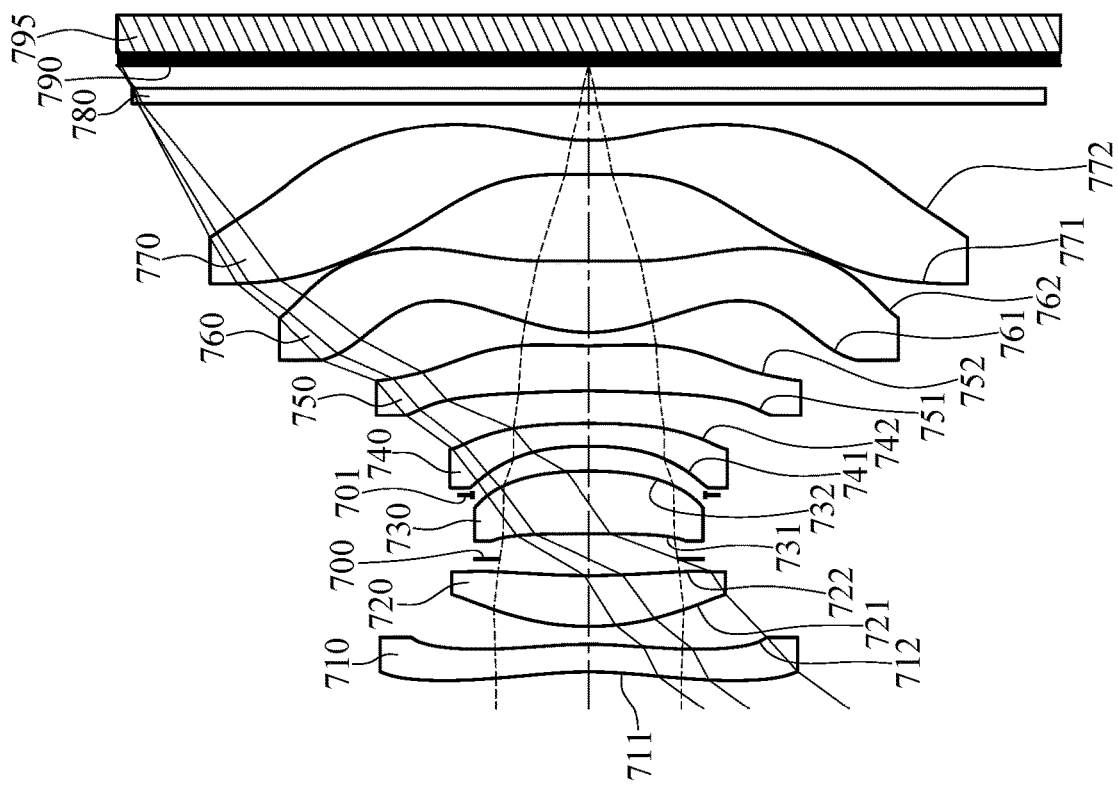
FIG. 13 is a schematic view of an image capturing unit according to the 7th embodiment of the present disclosure.
Figure 14:
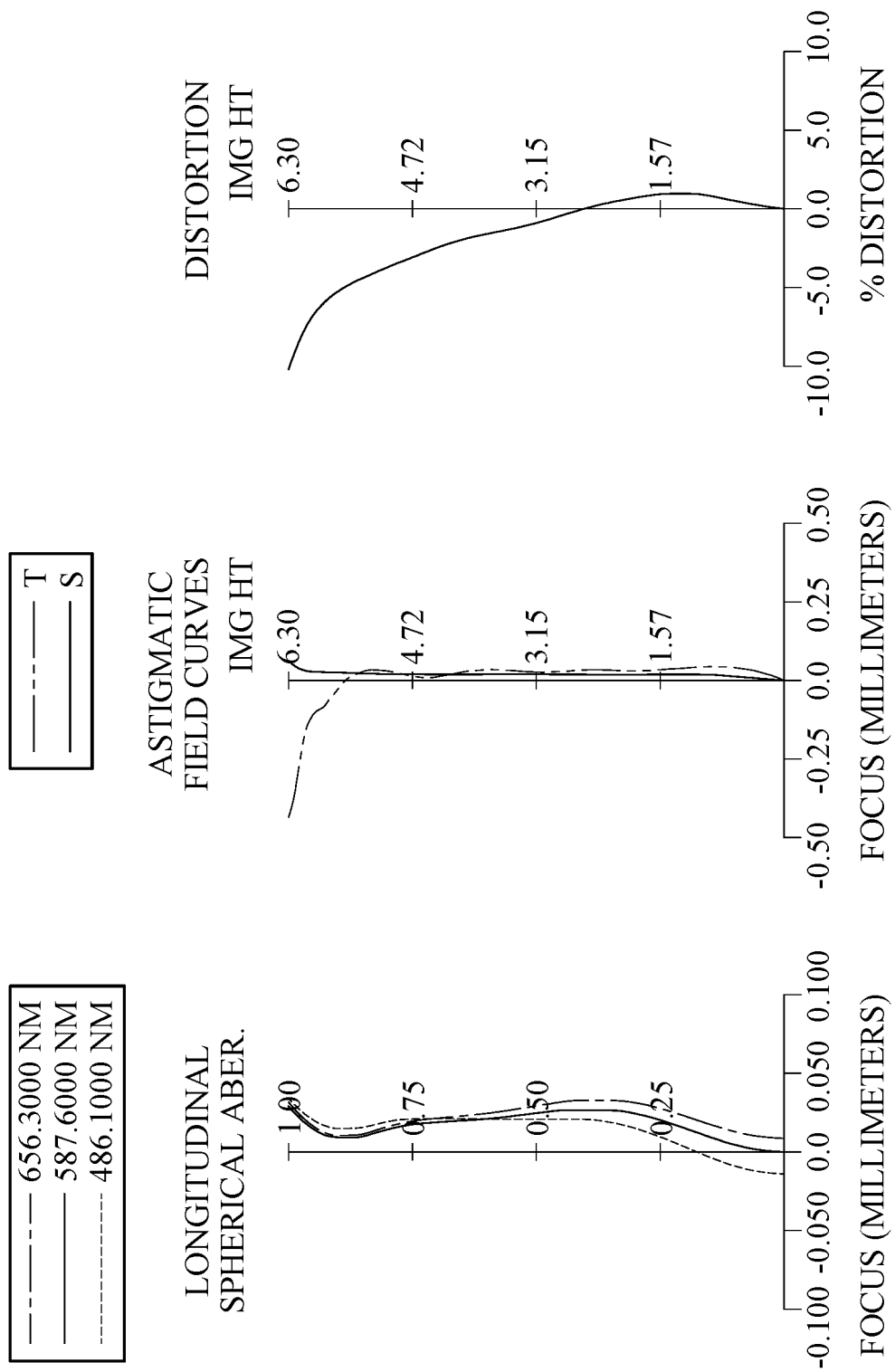
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical lens assembly (its reference numeral is omitted) of the present disclosure and an image sensor 795. The optical lens assembly includes, in order from an object side to an image side, a first lens element 710, a second lens element 720, an aperture stop 700, a third lens element 730, a stop 701, a fourth lens element 740, a fifth lens element 750, a sixth lens element 760, a seventh lens element 770, an IR-cut filter 780 and an image surface 790. The optical lens assembly includes seven lens elements (710, 720, 730, 740, 750, 760 and 770) with no additional lens element disposed between each of the adjacent seven lens elements.

The first lens element 710 with positive refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has at least one convex critical point in an off-axis region thereof. The image-side surface 712 of the first lens element 710 has at least one concave critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with negative refractive power has an object-side surface 771 being concave in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one convex critical point in an off-axis region thereof.

The IR-cut filter 780 is made of glass material and located between the seventh lens element 770 and the image surface 790, and will not affect the focal length of the optical lens assembly. The image sensor 795 is disposed on or near the image surface 790 of the optical lens assembly.

The detailed optical data of the 7th embodiment are shown in Table 13 and the aspheric surface data are shown in Table 14 below.

TABLE 13

7th Embodiment
f = 5.10 mm, Fno = 2.05, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.712 | (ASP) | 0.371 | Plastic | 1.640 | 34.0 | 224.43 |
| 2 | | −5.633 | (ASP) | 0.239 | | | | |
| 3 | Lens 2 | 3.957 | (ASP) | 0.681 | Plastic | 1.603 | 57.0 | 10.03 |
| 4 | | 10.710 | (ASP) | 0.218 | | | | |
| 5 | Ape. Stop | Plano | | 0.342 | | | | |
| 6 | Lens 3 | −36.547 | (ASP) | 0.840 | Plastic | 1.600 | 60.0 | 8.59 |
| 7 | | −4.554 | (ASP) | −0.327 | | | | |
| 8 | Stop | Plano | | 0.655 | | | | |
| 9 | Lens 4 | −4.417 | (ASP) | 0.306 | Plastic | 1.708 | 20.8 | −11.57 |
| 10 | | −9.858 | (ASP) | 0.442 | | | | |
| 11 | Lens 5 | −10.451 | (ASP) | 0.607 | Plastic | 1.620 | 42.6 | −7.34 |
| 12 | | 8.247 | (ASP) | 0.175 | | | | |
| 13 | Lens 6 | 2.153 | (ASP) | 0.957 | Plastic | 1.600 | 60.0 | 3.30 |
| 14 | | −20.200 | (ASP) | 1.162 | | | | |
| 15 | Lens 7 | −100.000 | (ASP) | 0.450 | Plastic | 1.600 | 60.0 | −3.95 |
| 16 | | 2.432 | (ASP) | 0.500 | | | | |
| 17 | IR-cut Filter | Plano | | 0.210 | Glass | 1.517 | 64.2 | — |
| 18 | | Plano | | 0.304 | | | | |
| 19 | Image | Plano | | 0.000 | | | | |

Note: Reference wavelength is 587.6 nm (d-line).
An effective radius of the stop 701 (Surface 8) is 1.560 mm.
An effective radius of the object-side surface 751 (Surface 11) is 2.450 mm.

TABLE 14

Aspheric Coefficients

| Surface # | 1 | 2 | 3 | 4 | 6 |
|---|---|---|---|---|---|
| k = | −4.6949E+01 | −6.0714E+01 | −5.8801E−01 | 3.7810E−01 | −1.0000E+00 |
| A4 = | 2.0038E−03 | 1.6827E−02 | 2.6787E−02 | −7.1413E−03 | −1.2051E−02 |
| A6 = | 6.3731E−03 | −3.6538E−03 | −3.0425E−02 | −2.4075E−03 | −1.9732E−02 |
| A8 = | −4.6364E−03 | 9.2361E−04 | 2.6765E−02 | 1.1643E−03 | 4.9946E−02 |
| A10 = | 1.8555E−03 | −7.7216E−04 | −2.1467E−02 | 7.6990E−04 | −9.2015E−02 |
| A12 = | −4.7107E−04 | 5.3855E−04 | 1.3279E−02 | −2.7571E−03 | 1.0299E−01 |
| A14 = | 7.7552E−05 | −2.0018E−04 | −5.6716E−03 | 2.6328E−03 | −7.2926E−02 |
| A16 = | −7.9999E−06 | 4.1328E−05 | 1.5297E−03 | −1.1968E−03 | 3.1878E−02 |
| A18 = | 4.6895E−07 | −4.5258E−06 | −2.3145E−04 | 2.6316E−04 | −7.9980E−03 |
| A20 = | −1.1869E−08 | 2.0675E−07 | 1.4845E−05 | −2.2407E−05 | 8.7529E−04 |

| Surface # | 7 | 9 | 10 | 11 | 12 |
|---|---|---|---|---|---|
| k = | 2.2314E+00 | 1.3037E+00 | −4.8886E+00 | −1.8591E+01 | −3.0232E+00 |
| A4 = | −1.6065E−02 | −2.8785E−02 | 1.0092E−02 | 2.7000E−02 | −1.0111E−01 |
| A6 = | −4.9290E−02 | −4.6099E−02 | −5.9513E−02 | −1.3192E−02 | 5.1763E−02 |
| A8 = | 1.0617E−01 | 2.8710E−02 | 5.0981E−02 | −1.0533E−03 | −2.3583E−02 |
| A10 = | −1.4772E−01 | 2.6321E−02 | −2.3150E−02 | 3.6216E−03 | 7.7322E−03 |
| A12 = | 1.3257E−01 | −5.1806E−02 | 5.4116E−03 | −1.8179E−03 | −1.6636E−03 |
| A14 = | −7.6311E−02 | 3.7551E−02 | −2.1084E−04 | 4.9098E−04 | 2.3476E−04 |
| A16 = | 2.6954E−02 | −1.4925E−02 | −2.3228E−04 | −7.9213E−05 | −2.1260E−05 |
| A18 = | −5.3271E−03 | 3.1909E−03 | 5.9302E−05 | 7.1352E−06 | 1.1254E−06 |
| A20 = | 4.5036E−04 | −2.8334E−04 | −4.6357E−06 | −2.7284E−07 | −2.6382E−08 |

| Surface # | 13 | 14 | 15 | 16 |
|---|---|---|---|---|
| k = | −6.4532E+00 | 0.0000E+00 | −9.0000E+01 | −9.7025E−01 |
| A4 = | −2.6526E−03 | 5.5474E−02 | −6.2671E−02 | −7.7654E−02 |
| A6 = | 4.1481E−03 | −1.7348E−02 | 9.7970E−03 | 1.7419E−02 |
| A8 = | −3.5347E−03 | 2.6376E−03 | −1.5243E−04 | −2.8548E−03 |
| A10 = | 9.6995E−04 | −2.3370E−04 | −1.1847E−04 | 3.2143E−04 |
| A12 = | −1.5387E−04 | 1.0875E−05 | 1.5794E−05 | −2.4156E−05 |
| A14 = | 1.5377E−05 | −4.2276E−08 | −9.8390E−07 | 1.1731E−06 |
| A16 = | −9.3515E−07 | −2.4140E−08 | 3.3853E−08 | −3.5017E−08 |

TABLE 14-continued

| Aspheric Coefficients | | | |
|---|---|---|---|
| A18 = | 3.1319E−08 | 1.2021E−09 | −6.2092E−10 | 5.8120E−10 |
| A20 = | −4.4165E−10 | −1.9294E−11 | 4.7573E−12 | −4.0949E−12 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.10 | f/R13 | −0.05 |
| Fno | 2.05 | f2/f3 | 1.17 |
| HFOV [deg.] | 54.0 | T67/T12 | 4.86 |
| V1/N1 | 20.73 | T67/T23 | 1.71 |
| V2/N2 | 35.56 | T67/T34 | 2.08 |
| V3/N3 | 37.50 | T67/T45 | 1.38 |
| V4/N4 | 12.18 | T67/T56 | 3.54 |
| V5/N5 | 26.30 | Y11/Y72 | 0.53 |
| V6/N6 | 37.50 | Yc11/f | 0.38 |
| V7/N 7 | 37.50 | Yc12/f | 0.29 |
| (R11 + R12)/(R11 − R12) | −0.81 | Yc72/f | 0.35 |
| f/R1 | −0.89 | Yc11/Yc72 | 1.10 |
| f/R2 | −0.90 | Y72/BL | 5.00 |
| (f/R1) + (f/R2) | −1.80 | TL/ImgH + cot(FOV) | 0.97 |
| f/R8 | −0.52 | — | — |

8th Embodiment

Figure 15:
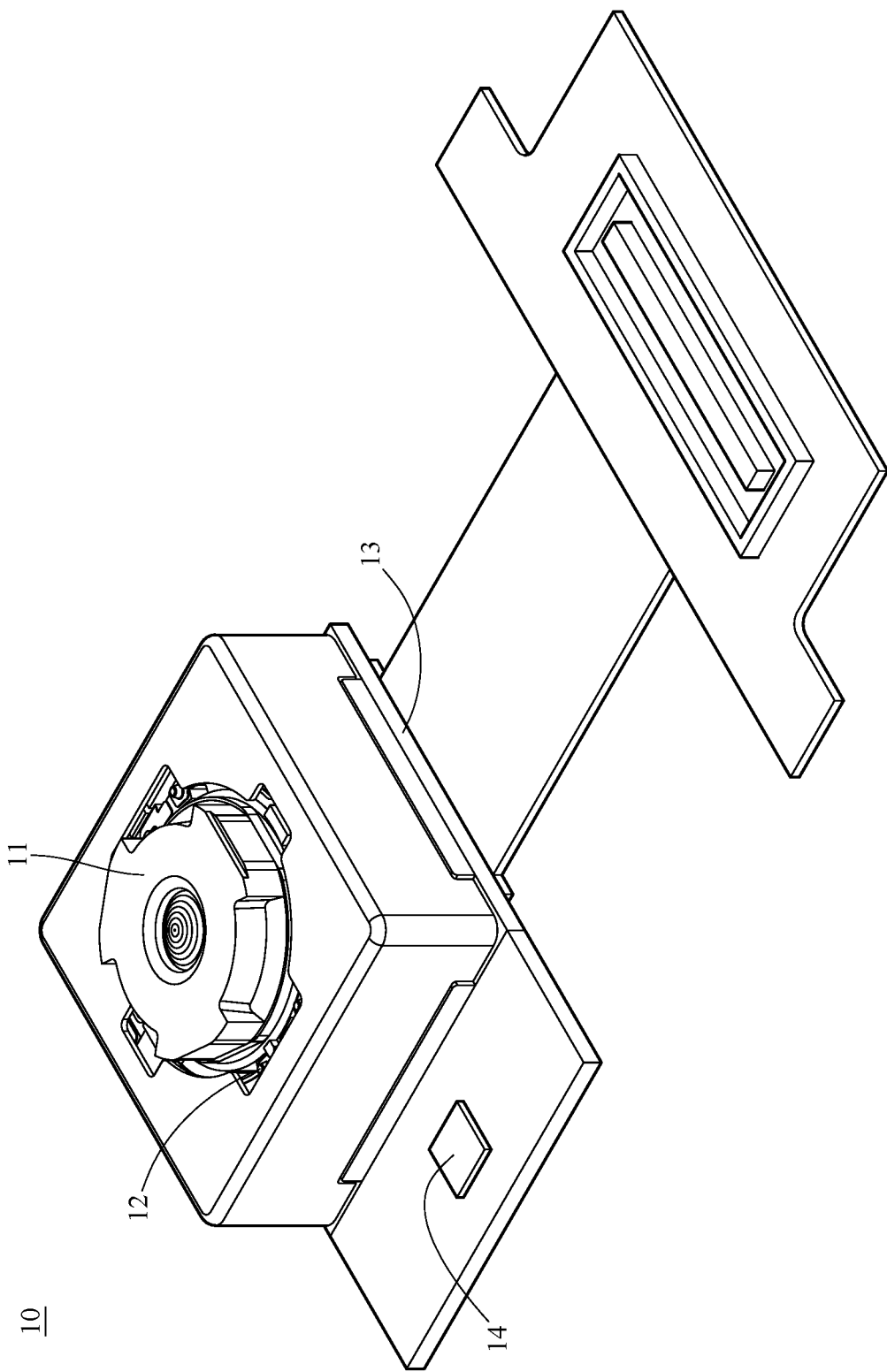
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the optical lens assembly disclosed in the 1st embodiment, a barrel and a holder member (their reference numerals are omitted) for holding the optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

9th Embodiment

Figure 16:
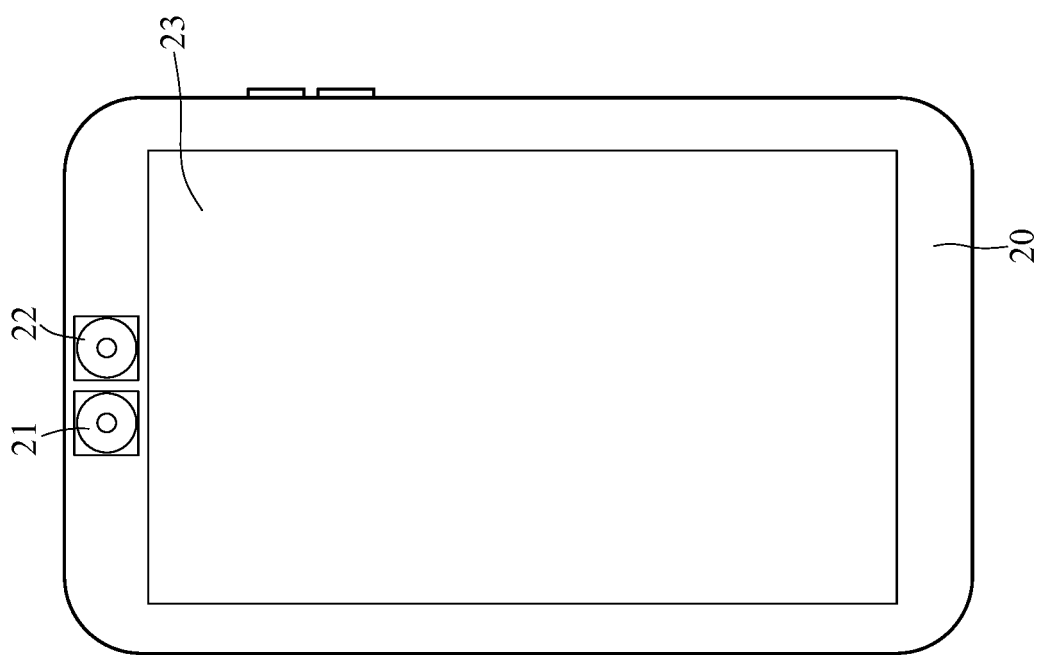
FIG. 16 is a front view of an electronic device according to the 9th embodiment of the present disclosure.

FIG. 16 is a front view of an electronic device according to the 9th embodiment of the present disclosure.

In this embodiment, an electronic device 20 is a smartphone including an image capturing unit 21, an image capturing unit 22, and a display unit 23. In this embodiment, the image capturing units 21 and 22 have different fields of view (e.g., the image capturing unit 21 is an ultra-wide-angle image capturing unit and the image capturing unit 22 is a wide-angle image capturing unit), such that the electronic device 20 has various magnification ratios so as to meet the requirement of optical zoom functionality. The image capturing unit 21 includes the optical lens assembly disclosed in the 1st embodiment and an image sensor (their reference numbers are omitted). In FIG. 16, the image capturing unit 21, the image capturing unit 22 and the display unit 23 are all disposed on one side of the electronic device 20. The image capturing unit 21 is a front-facing camera of the electronic device 20 for taking selfies, but the present disclosure is not limited thereto.

10th Embodiment

Figure 17:
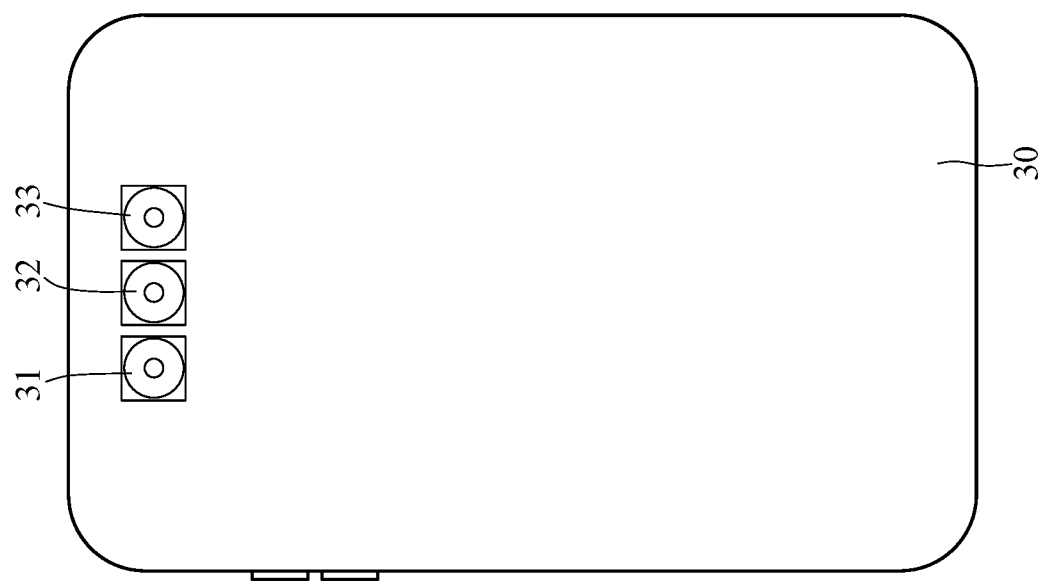
FIG. 17 is a back view of an electronic device according to the 10th embodiment of the present disclosure.

FIG. 17 is a back view of an electronic device according to the 10th embodiment of the present disclosure.

In this embodiment, an electronic device 30 is a smartphone including an image capturing unit 31, an image capturing unit 32, an image capturing unit 33 and a display unit (its reference number is omitted). In this embodiment, the image capturing units 31, 32 and 33 have different fields of view (e.g., the image capturing unit 31 is an ultra-wide-angle image capturing unit, the image capturing unit 32 is a wide-angle image capturing unit and the image capturing unit 33 is a telephoto image capturing unit), such that the electronic device 30 has various magnification ratios so as to meet the requirement of optical zoom functionality. The image capturing unit 31 includes the optical lens assembly disclosed in the 1st embodiment and an image sensor (their reference numbers are omitted). In this embodiment, the image capturing unit 31, 32 and 33 are all disposed on one side of the electronic device 30, while the display unit is disposed on the opposite side of the electronic device 30.

11th Embodiment

Figure 18:
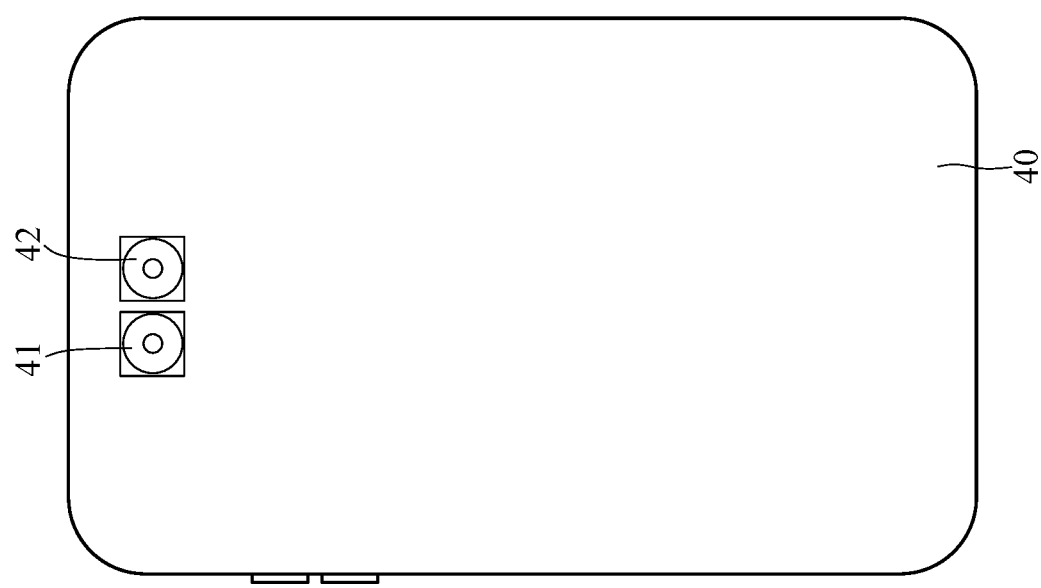
FIG. 18 is a back view of an electronic device according to the 11th embodiment of the present disclosure.

FIG. 18 is a back view of an electronic device according to the 11th embodiment of the present disclosure.

In this embodiment, an electronic device 40 is a smartphone including an image capturing unit 41, an image capturing unit 42 and a display unit (its reference number is omitted). In this embodiment, the image capturing units 41 and 42 have different fields of view (e.g., the image capturing unit 41 is an ultra-wide-angle image capturing unit and the image capturing unit 42 is a wide-angle image capturing unit), such that the electronic device 40 has various magnification ratios so as to meet the requirement of optical zoom functionality. The image capturing unit 41 includes the optical lens assembly disclosed in the 1st embodiment and an image sensor (their reference numbers are omitted). In this embodiment, the image capturing unit 41 and 42 are all disposed on one side of the electronic device 40, while the display unit is disposed on the opposite side of the electronic device 40.

The smartphone in this embodiment is only exemplary for showing the image capturing units including the optical lens assembly of the present disclosure installed in an electronic device, and the present disclosure is not limited thereto. The optical lens assembly can be optionally applied to optical systems with a movable focus. Furthermore, the optical lens assembly features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising seven lens elements, the seven lens elements being, in order from an object side to an image side, a first lens element, a second lens element, a third lens element, a fourth lens element, a fifth lens element, a sixth lens element and a seventh lens element;

wherein the second lens element with positive refractive power has an object-side surface being convex in a paraxial region thereof, the third lens element has an image-side surface being convex in a paraxial region thereof, the sixth lens element with positive refractive power has an object-side surface being convex in a paraxial region thereof, the seventh lens element has an image-side surface being concave in a paraxial region thereof, the image-side surface of the seventh lens element has at least one convex critical point in an off-axis region thereof, and the optical lens assembly has a total of seven lens elements; and wherein a focal length of the optical lens assembly is f, a focal length of the second lens element is f2, a curvature radius of an object-side surface of the first lens element is R1, a focal length of the third lens element is f3, a curvature radius of an image-side surface of the first lens element is R2, a curvature radius of the object-side surface of the sixth lens element is R11, a curvature radius of an image-side surface of the sixth lens element is R12, and the following conditions are satisfied:

$(f/R1)+(f/R2)<-0.80$;

$f/R2<0.60$;

$(R11+R12)/(R11-R12)<0.50$; and $f2/f3<7.5$.

2. The optical lens assembly of claim 1, wherein a maximum effective radius of the image-side surface of the seventh lens element is Y72, an axial distance between the image-side surface of the seventh lens element and an image surface is BL, and the following condition is satisfied:

$2.50<Y72/BL$.

3. The optical lens assembly of claim 1, wherein an axial distance between an object-side surface of the first lens element and an image surface is TL, a maximum image height of the optical lens assembly is ImgH, a maximum field of view of the optical lens assembly is FOV, a maximum effective radius of the object-side surface of the first lens element is Y11, a maximum effective radius of the image-side surface of the seventh lens element is Y72, and the following conditions are satisfied:

$0.80<(TL/ImgH)+\cot(FOV)<1.25$; and $Y11/Y72<1.0$.

4. The optical lens assembly of claim 1, wherein the focal length of the second lens element is f2, the focal length of the third lens element is f3, and the following condition is satisfied:

$f2/f3<2.0$.

5. The optical lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least one lens element of the optical lens assembly satisfies the following condition:

$8.0<Vi/Ni<11.8$, wherein $i=1,2,3,4,5,6$ or $7$.

6. An image capturing unit, comprising:
the optical lens assembly of claim 1; and
an image sensor disposed on an image surface of the optical lens assembly.

7. An electronic device, comprising:
the image capturing unit of claim 6.

8. An optical lens assembly comprising seven lens elements, the seven lens elements being, in order from an object side to an image side, a first lens element, a second lens element, a third lens element, a fourth lens element, a fifth lens element, a sixth lens element and a seventh lens element;

wherein the second lens element with positive refractive power has an object-side surface being convex in a paraxial region thereof, the third lens element has an image-side surface being convex in a paraxial region thereof, the fourth lens element has negative refractive power, the fifth lens element has negative refractive power, the sixth lens element with positive refractive power has an object-side surface being convex in a paraxial region thereof, the seventh lens element has an image-side surface being concave in a paraxial region thereof, the image-side surface of the seventh lens element has at least one convex critical point in an off-axis region thereof, and the optical lens assembly has a total of seven lens elements; and wherein a focal length of the optical lens assembly is f, a focal length of the second lens element is f2, a focal length of the third lens element is f3, a curvature radius of an image-side surface of the first lens element is R2, a curvature radius of the object-side surface of the sixth lens element is R11, a curvature radius of an image-side surface of the sixth lens element is R12, and the following conditions are satisfied:

$f/R2<0.60;$ $(R11+R12)/(R11-R12)<0.50;$ and $f2/f3<7.5.$

9. An optical lens assembly comprising seven lens elements, the seven lens elements being, in order from an object side to an image side, a first lens element, a second lens element, a third lens element, a fourth lens element, a fifth lens element, a sixth lens element and a seventh lens element;

wherein an image-side surface of the first lens element is convex in a paraxial region thereof and has at least one concave critical point in an off-axis region thereof, the second lens element with positive refractive power has an object-side surface being convex in a paraxial region thereof, the third lens element has an image-side surface being convex in a paraxial region thereof, the sixth lens element with positive refractive power has an object-side surface being convex in a paraxial region thereof, the seventh lens element has an image-side surface being concave in a paraxial region thereof, the image-side surface of the seventh lens element has at least one convex critical point in an off-axis region thereof, and the optical lens assembly has a total of seven lens elements;

wherein a vertical distance between a critical point on an object-side surface of the first lens element and an optical axis is Yc11, a vertical distance between the critical point on the image-side surface of the first lens element and the optical axis is Yc12, a focal length of the optical lens assembly is f, and the following conditions are satisfied:

$0.20<Yc11/f<0.60;$ and $0.10<Yc12/f<0.50;$ and wherein a focal length of the second lens element is f2, a focal length of the third lens element is f3, a curvature radius of the image-side surface of the first lens element is R2, a curvature radius of the object-side surface of the sixth lens element is R11, a curvature radius of an image-side surface of the sixth lens element is R12, and the following conditions are satisfied:

$f/R2<0.60;$ $(R11+R12)/(R11-R12)<0.50;$ and $f2/f3<7.5.$

* * * * *